(12) United States Patent
Chope et al.

(10) Patent No.: US 11,969,981 B2
(45) Date of Patent: Apr. 30, 2024

(54) SINGLE AND DUAL PARALLEL WEBLINE ASSEMBLY

(71) Applicant: CreateMe Technologies LLC, New York, NY (US)

(72) Inventors: Nicholas Chope, Portland, OR (US); Michael William Tanguay, Camas, WA (US)

(73) Assignee: CreateMe Technologies Inc., Newark, CA (US)

( * ) Notice: Subject to any disclaimer, the term of this patent is extended or adjusted under 35 U.S.C. 154(b) by 0 days.

(21) Appl. No.: 17/835,164

(22) Filed: Jun. 8, 2022

(65) Prior Publication Data
US 2023/0398773 A1 Dec. 14, 2023

(51) Int. Cl.
*B32B 37/02* (2006.01)
*B32B 37/00* (2006.01)
*B32B 37/12* (2006.01)
*B32B 37/18* (2006.01)
*B32B 38/00* (2006.01)

(52) U.S. Cl.
CPC .......... *B32B 37/02* (2013.01); *B32B 37/0046* (2013.01); *B32B 37/12* (2013.01); *B32B 37/18* (2013.01); *B32B 38/0004* (2013.01); *B32B 38/145* (2013.01)

(58) Field of Classification Search
CPC ..... B32B 37/02; B32B 37/0046; B32B 37/12; B32B 37/18; B32B 38/0004; B32B 38/145; B29C 2793/0072; B29C 66/95; Y10T 156/1075
USPC ......................................... 156/264, 353, 356
See application file for complete search history.

(56) References Cited

U.S. PATENT DOCUMENTS

| | | | | |
|---|---|---|---|---|
| 5,624,520 | A * | 4/1997 | Nedblake | B65C 9/1803 156/289 |
| 6,652,686 | B1 * | 11/2003 | Coenen | A61F 13/15772 156/379 |
| 7,178,571 | B2 * | 2/2007 | Vergona | A61F 13/15772 101/481 |
| 8,958,901 | B2 | 2/2015 | Regan | |
| 10,265,940 | B2 | 4/2019 | Jess et al. | |
| 2013/0008595 | A1 * | 1/2013 | Ripley | H01M 4/8814 156/256 |
| 2020/0071111 | A1 * | 3/2020 | Newbury | G06F 16/2379 |

FOREIGN PATENT DOCUMENTS

WO WO2018225604 A1 * 12/2018 ............... A41C 3/10
WO 2021005053 A1 1/2021

OTHER PUBLICATIONS

English machine translation of WO2018225604A1; Dec. 2018; Utaka; A41C3/10; 5 pages. (Year: 2018).*

* cited by examiner

*Primary Examiner* — Linda L Gray

(57) ABSTRACT

Systems and methods facilitate the automated manufacture of fabric articles. In an example operation, a single web of fabric is unwound and transported to a sequence of stations. At one station, the unwound fabric is cut to create first and second components of the fabric article and a web of remainder fabric. Then the web of remainder fabric is removed from the first and second components of the fabric article. At another station, adhesive is applied to the second component. Then a robot positions the first component onto the second component. At another station, the adhesive is cured. At another station, a design in printed onto the first component.

10 Claims, 19 Drawing Sheets

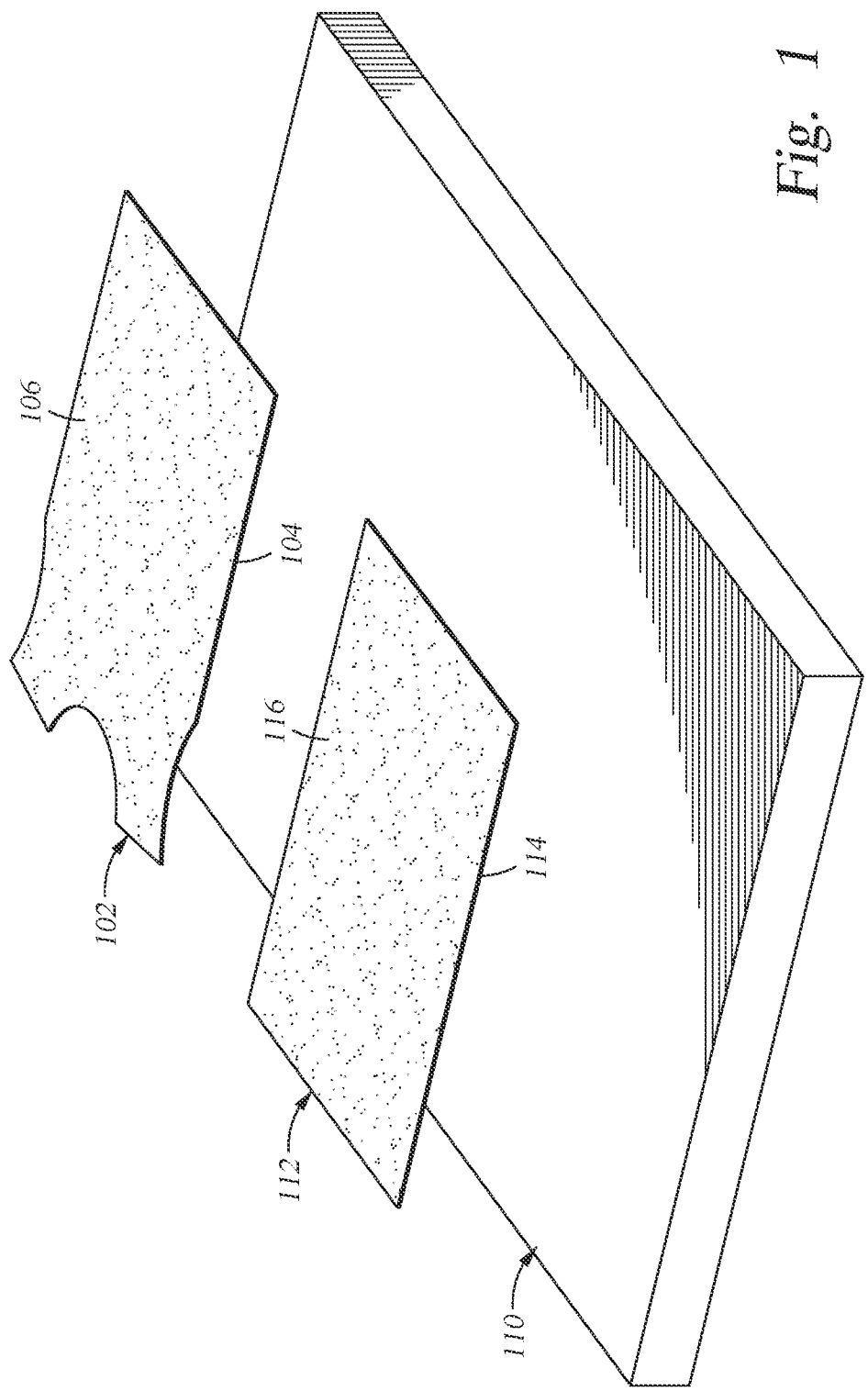

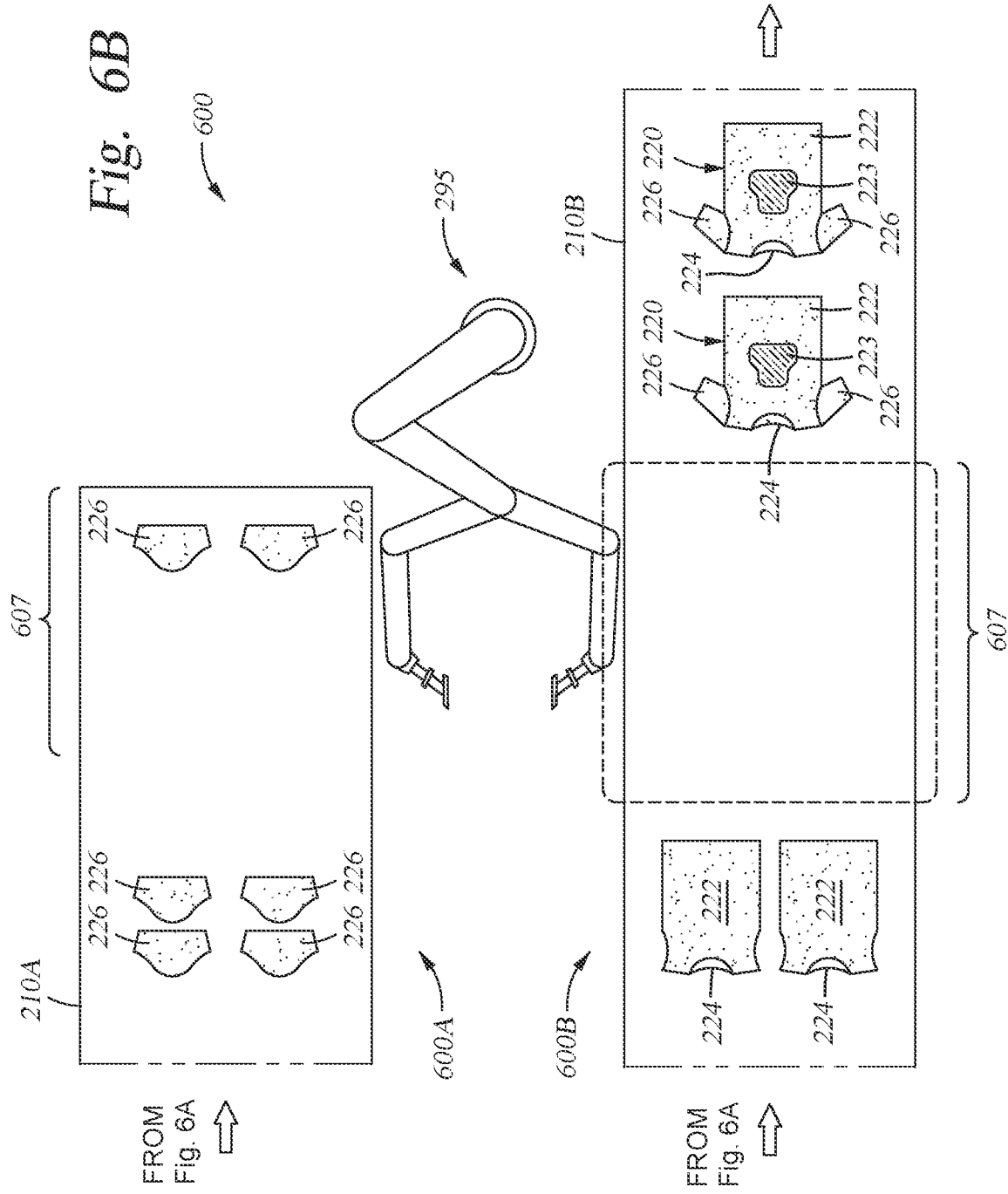

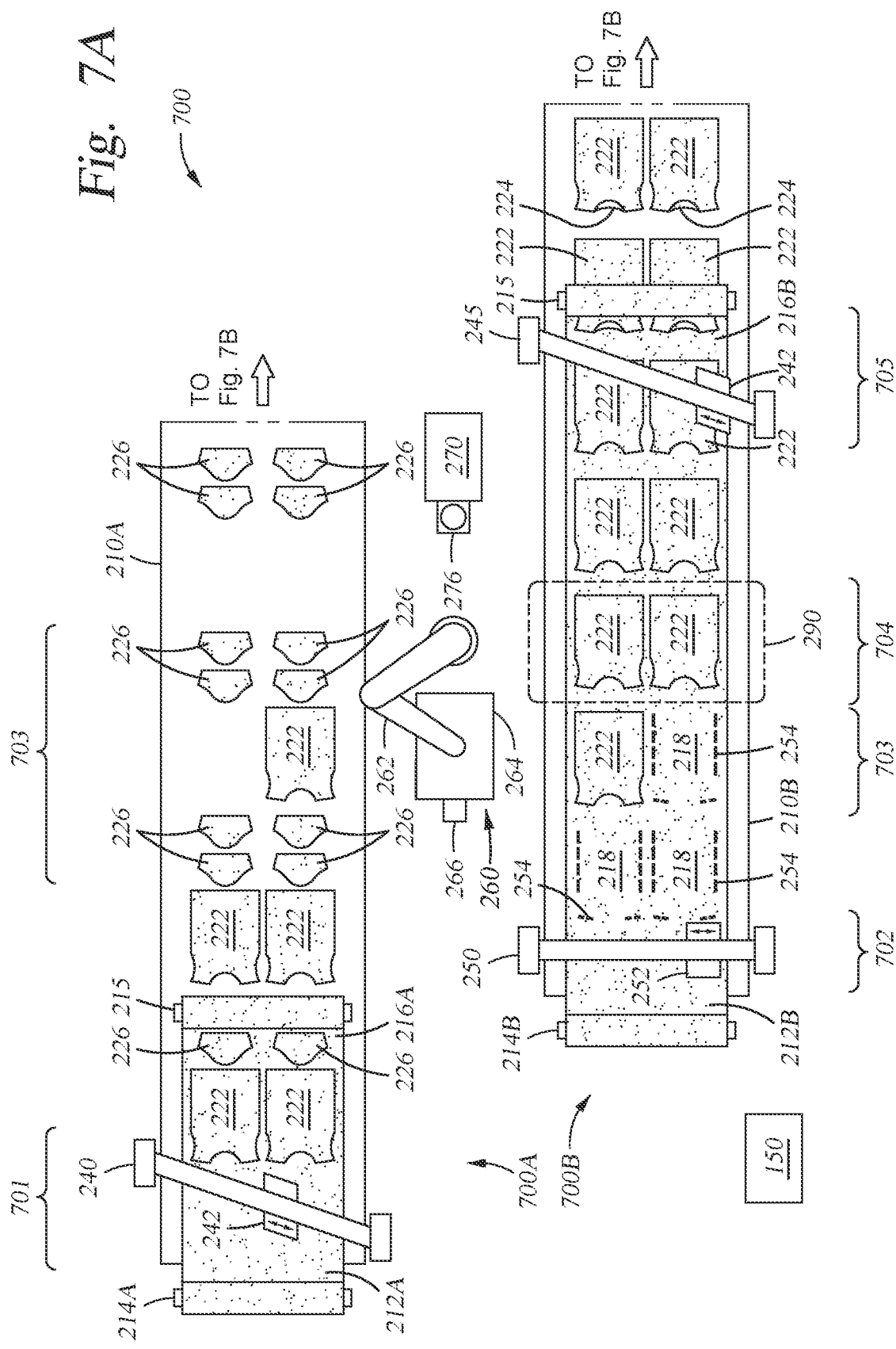

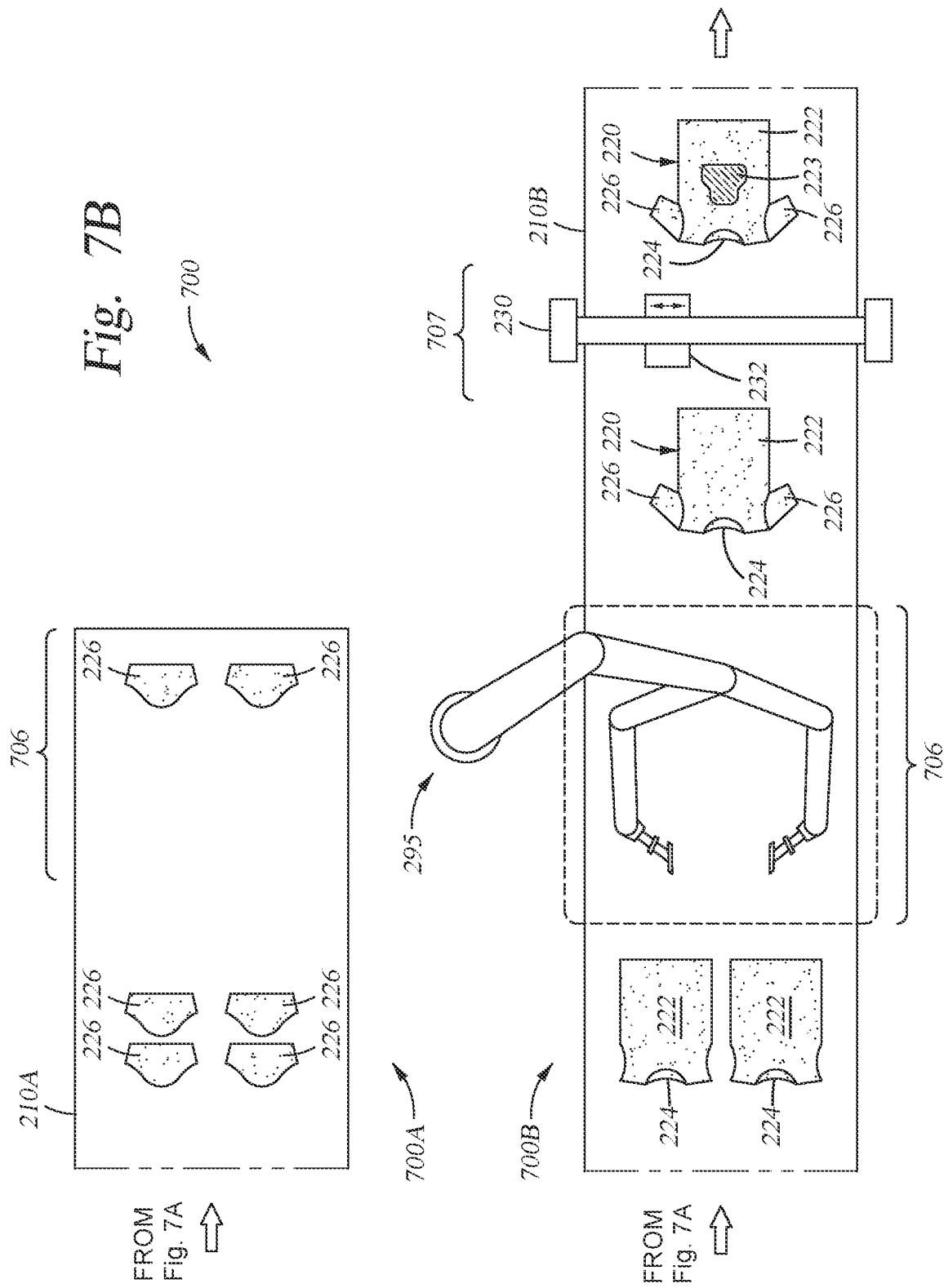

SINGLE AND DUAL PARALLEL WEBLINE ASSEMBLY

TECHNICAL FIELD

Embodiments presented in this disclosure generally relate to apparatus, systems, and methods for manufacturing fabric articles, such as garments.

BACKGROUND

Despite technological advances and the introduction of automation in many types of manufacturing, the manufacturing of fabric articles, such as garments, remains very labor-intensive. Sewing machines were invented in the early nineteenth century and were made possible based on the development of the lock stitch sewing technique. Today, some hundred and fifty years later, this same technology remains the foundation of garment manufacturing. The modern process of producing large quantities of ready-to-wear apparels relies heavily on manual labor, and remains inefficient relative to other industrial manufacturing processes. Garment manufacturing includes multiple steps including sizing, folding, fitting, cutting, sewing, and material handling. The unique and varied properties of individual fabrics, such as weight, thickness, strength, stretch, and drape, as well as the complex nature of certain tasks, complicates material handling and automated garment manufacturing.

In most small and large apparel manufacturing factories, most of the material handling and apparel manufacturing operations are conducted in a manual or semi-manual manner. The garment manufacturing process may start with laying out a web of fabric for 24 hours to relax the fabric and remove wrinkles. Then, one or more layers of fabric may be cut based on patterns and dimensions matching the desired garment. Then, the cut fabric pieces are transferred from workstation to workstation, where at each workstation, one, two, or more pieces of fabrics are manually folded, overlapped along the seams and fed into a sewing machine or serger machine (also referred to as an overlock machine). Given the variety of fabrics, threads, seam types, and stitch types found in a finished garment, a larger number of workstations with specialized tools and skilled operators is required for assembling a garment. This means the fabrics or unfinished garments spend much time in transit between workstations, which adversely affects the time required to complete a garment. Thus, traditional apparel manufacturing operations may include multiple sequential processes. Further, a time constant may be required between each operation to allow the fabric to relax, which further increases the time required to process a garment.

Despite advances in technology, machines still struggle with performing certain tasks that are easily handled by a trained worker with average hand-eye coordination skills. This is one reason the garment manufacturing industry is in a constant search of cheaper human labor rather than investing in advanced automated manufacturing systems. To increase production, a factory may add additional production lines in parallel, which does little to improve efficiency. Even in large factories, most work is performed in piecemeal fashion with limited coordination between various stations/steps, and movement of material between each station requires a great deal of manual product handling.

Accordingly, there is a need for an automated system for manufacturing garments to improve factory throughput and reduce reliance on manual labor.

SUMMARY

Embodiments presented in this disclosure generally relate to apparatus, systems, and methods for manufacturing fabric articles, such as garments. In one embodiment, a method of manufacturing a fabric article includes unwinding a single web of fabric, thereby creating an unwound fabric, printing a design onto the unwound fabric at a first station, transporting the unwound fabric to a second station, and cutting the unwound fabric at the second station to create first and second components of the fabric article and a web of remainder fabric. The first component is created by cutting the unwound fabric around the design, and each of the first and second components includes a first side facing a work surface and a second side opposite the first side. The method further includes removing the web of remainder fabric from the first and second components, transporting the first and second components to a third station, and applying an adhesive to the second side of the second component at the third station. The method further includes transporting the first and second components to a fourth station, using a robot at the fourth station to position the first component onto the second component such that the second side of the first component faces the second side of the second component, and bonding the first component to the second component using the adhesive.

In another embodiment, a method of manufacturing a fabric article includes unwinding a single web of fabric, thereby creating an unwound fabric, printing a design onto the unwound fabric at a first station, transporting the unwound fabric to a second station, and cutting the unwound fabric at the second station to create a component of the fabric article. The component is created by cutting the unwound fabric around the design, and each of the component and the unwound fabric includes a first side facing a work surface and a second side opposite the first side. The method further includes transporting the unwound fabric and the component to a third station, and applying adhesive to a portion of the unwound fabric at the third station. The method further includes transporting the unwound fabric and the component to a fourth station, using a robot at the fourth station to position the component onto the portion of the unwound fabric such that the second side of the component faces the second side of the portion of the unwound fabric, and bonding the component to the portion of the unwound fabric using the adhesive. The method further includes transporting the unwound fabric to a fifth station, cutting the unwound fabric at the fifth station to separate the portion of the unwound fabric from a remainder of the unwound fabric, and removing the remainder of the unwound fabric from the portion of the unwound fabric.

In another embodiment, a method of manufacturing a fabric article includes unwinding a single web of fabric, thereby creating an unwound fabric, cutting the unwound fabric at a first station to create a component of the fabric article, transporting the unwound fabric and the component to a second station, applying adhesive to a portion of the unwound fabric at the second station, transporting the unwound fabric and the component to a third station, and using a robot at the third station to position the component onto the portion of the unwound fabric. The method further includes bonding the component to the portion of the unwound fabric using the adhesive, transporting the unwound fabric to a fourth station, cutting the unwound fabric at the fourth station to separate the portion of the unwound fabric from a remainder of the unwound fabric, removing the remainder of the unwound fabric from the portion of the unwound fabric, transporting the portion of the unwound fabric to a fifth station, and printing a design onto the component at the fifth station.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 1 is an exploded isometric view that schematically illustrates the orientation of the "sides" of a fabric when the fabric is on a work surface.

FIGS. 6A and 6B schematically illustrate a system for manufacturing a fabric article.

FIGS. 7A and 7B schematically illustrate a system for manufacturing a fabric article.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 2A:
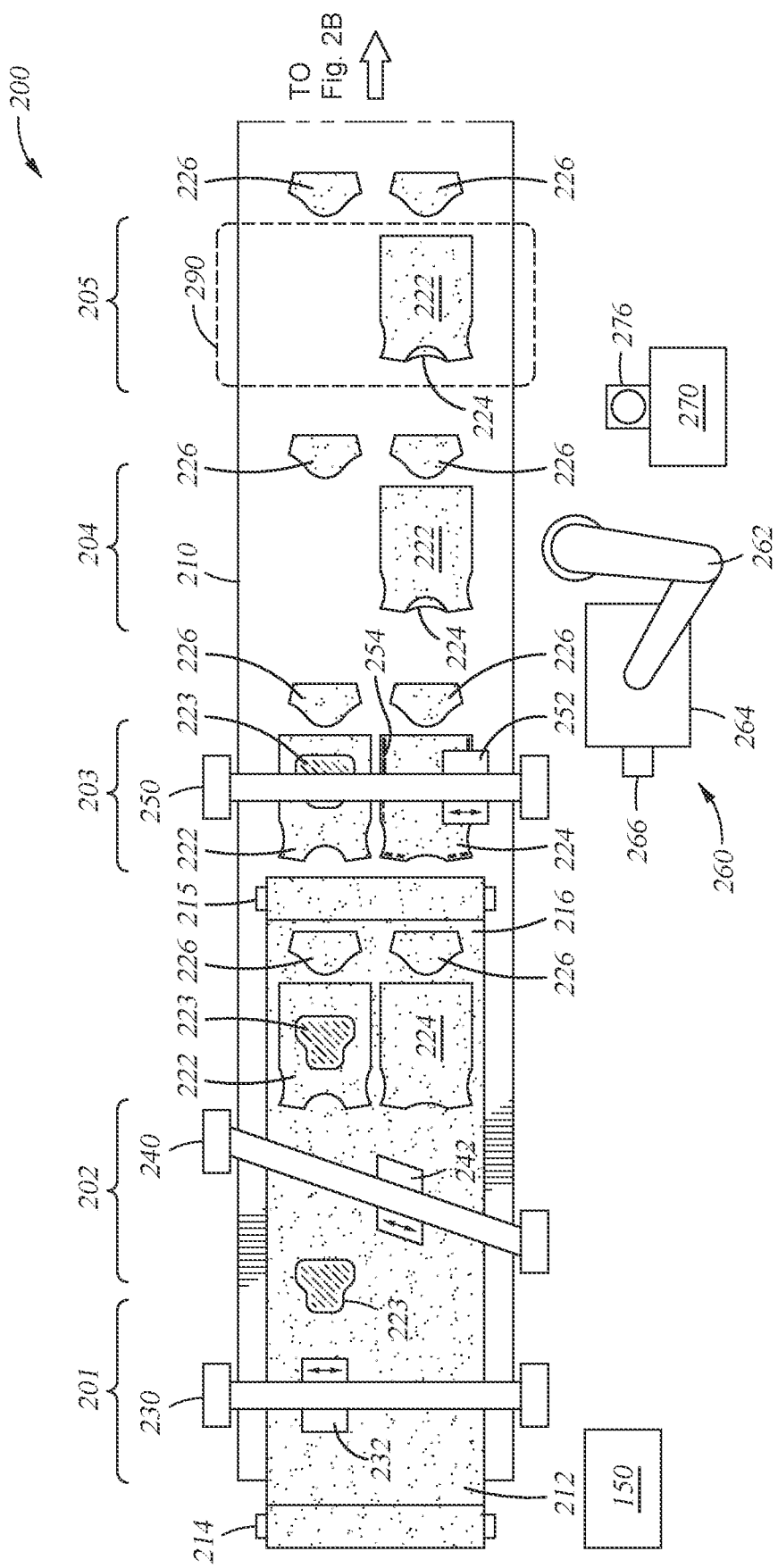
FIGS. 2A and 2B schematically illustrate a system for manufacturing a fabric article.

Embodiments presented in this disclosure generally relate to apparatus, systems, and methods for handling fabrics, such as textiles, such as sheet materials, such as leather, cloth, and the like, in the manufacture of articles. Some examples of such articles include, but are not limited to, garments (e.g. shirts, pants, socks, shoes, shorts, coats, jackets, skirts, dresses, underwear, hats, headbands, and the like), accessories (e.g. wallets, purses, and the like), and homewares (e.g. artwork, upholstery, towels, bed linens, blankets, mats, and the like).

Some fabrics (so-called "single-faced fabrics") include a "right side" designated to be on show in the finished article, and a "wrong side" designated to be hidden in the finished article. When such fabrics include a printed design, typically the print is applied to the right side. Additionally, when such fabrics are joined, typically the join is made right side to right side, then the joined fabrics are reversed (for example by turning inside-out) such that excess fabric at the join is hidden, and the right sides become facing outwards from each other. Some other fabrics (so-called "double-faced fabrics") are created with two right sides and no wrong sides. Such fabrics are constructed such that either of the two right sides can be designated to be on show in the finished article.

Each system and method of the present disclosure may be used with single-faced and double-faced fabrics. Each system and method of the present disclosure includes the performance of manufacturing operations on a web of fabric and on items cut from a web of fabric. At least some of the manufacturing operations are performed with the fabric on a work surface, such as a cutting table, printing table, or the like. When on a work surface, each web of fabric—and any item cut from each web of fabric—includes a first side facing the work surface (i.e. facing down) and a second side opposite the first side facing away from the work surface (i.e. facing up). In each system and method of the present disclosure, either of the first side or the second side may be a right side.

FIG. 1 provides a general reference incorporated into the description of each system of the present disclosure. FIG. 1 is an exploded isometric view that schematically illustrates the orientation of the "sides" of fabric when the fabric is on a work surface 110. The work surface 110 represents any work surface of any system of the present disclosure. The fabric 112 represents any web of fabric of any system of the present disclosure. The fabric 112 includes a first side 114 and a second side 116 opposite the first side 114. When placed on the work surface 110, the first side 114 faces the work surface 110 (i.e. facing down), and the second side 116 faces away from the work surface 110 (i.e. facing up). The item 102 represents any item or component cut from a web of fabric of any system of the present disclosure. The item 102 includes a first side 104 and a second side 106 opposite the first side 104. When originally cut from the fabric 112 on the work surface 110, the first side 104 faces the work surface 110 (i.e. facing down), and the second side 106 faces away from the work surface 110 (i.e. facing up). Depending on the specifics of each system, the orientation of first side 104 and second side 106 may be unchanged or may be reversed when the item 102 is moved and positioned onto another item or web of fabric. In an example, after positioning the item 102 onto another item, the second side 106 may remain facing away from the work surface 110 or the item 102 may be flipped such that the second side 106 faces the work surface 110.

Figure 2B:
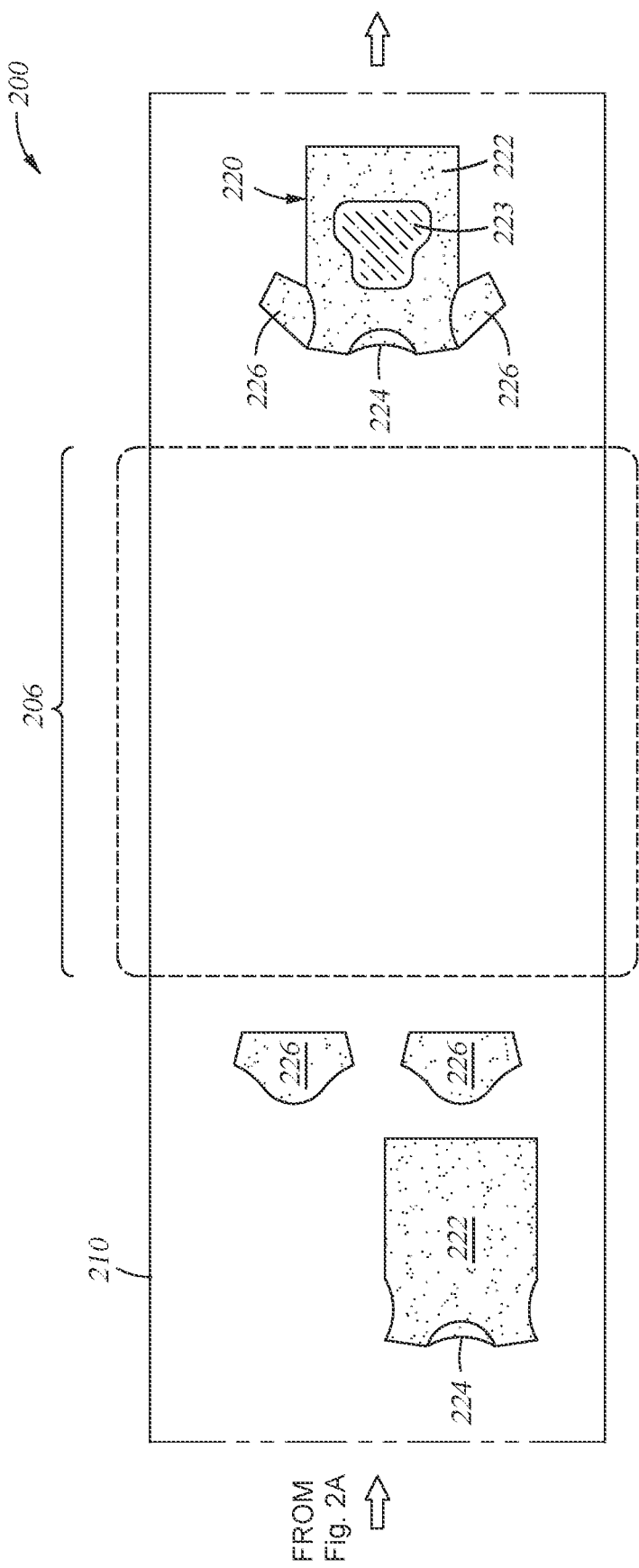

FIGS. 2A and 2B schematically illustrate a system 200 for manufacturing a fabric article 220 (shown in FIG. 2B). In some embodiments, the system 200 includes a controller 150 for monitoring and controlling the operations of the system 200. The controller 150 may include one or more software applications stored in memory and executed using one or more processors in a computing system. The controller 150 receives data from sensors, such as cameras, proximity sensors, and the like. The sensors are associated with the apparatus of the system 200. The controller 150 processes the data, and directs the operation of one or more pieces of apparatus of the system 200.

A single web of fabric 212 is unwound, such as from a roller 214. In some embodiments, the unwinding operation is controlled by the controller 150. The unwound web of fabric 212 and/or a component cut from the web of fabric 212 is transported to a sequence of stations. In some embodiments, a conveyor transports individual fabric components between stations. In some embodiments, a robot transports individual fabric components between stations. At each station one or more operations are performed in the manufacture of the fabric article 220. The operations are performed on a work surface, such as a cutting table, printing table, and the like. In the Figures, the work surface 210 represents any work surface. In some embodiments, the work surface 210 is a conveyor.

In some embodiments, the work surface 210 is configured to selectively hold and release the web of fabric 212 and/or a component cut from the web of fabric 212. In an example, the work surface 210 includes one or more electrostatic plates. In another example, the work surface 210 includes a vacuum assembly, such as a perforated plate coupled to a vacuum pump. In some embodiments, operation of the fabric holding mechanism of the work surface 210 is controlled by the controller 150.

The unwound web of fabric 212 is transported to station 201, which includes a printer 230. The printer 230 prints a design 223 onto the web of fabric 212. In some embodiments, the printer 230 includes a printhead 232 that is movable with respect to the web of fabric 212 while printing the design 223. In some embodiments, such as in the manufacture of fabric articles 220 that do not include a printed design 223, the printing operation may be omitted.

In some embodiments, the printer 230 may comprise at least one of: a Direct To Garment (DTG) printer, a sublimation printer, or a screen printing printer. In some embodiments, the fabric 212 may be a single color fabric, such as white color fabric, and the printer 230 may print on part of or on the entire fabric 212 to dye, colorize, or create a customized color and design pattern. In some embodiments, the printing by the printer 230 may be performed as an on-demand process, based on the requirements of the particular job. In an example, the color(s) and/or pattern(s) applied by the printer 230 are tailored for the manufacture of each individual fabric article 220.

In some embodiments, the printer 230 is controlled by the controller 150. In an example, a sensor associated with the printer 230 detects a feature of the web of fabric 212, such as a fiducial on or in the web of fabric 212. The controller 150 uses information of the detected feature to direct the printer 230 to print the design 223 at a specific location of the web of fabric 212.

Then the web of fabric 212 is transported to station 202, which includes a cutter 240. In some embodiments, the cutter 240 includes a blade on a carrier 242 that is movable with respect to the web of fabric 212 while cutting the web of fabric 212. The cutter 240 cuts the web of fabric 212 to create a first component 222 of the fabric article 220 and a second component 224 of the fabric article 220. As illustrated, in some embodiments, the cutter 240 cuts the web of fabric 212 to create one or more additional components 226 of the fabric article 220.

In some embodiments, the cutter 240 is controlled by the controller 150. In an example, a sensor associated with the cutter 240 detects a feature of the web of fabric 212, such as the printed design 223 or a fiducial on or in the web of fabric 212. The controller 150 uses information of the detected feature to direct the cutter 240 to cut the web of fabric 212 at a specific location of the web of fabric 212.

As illustrated, in embodiments in which the printer 230 has printed the design 223 onto the web of fabric 212, the first component 222 may include the portion of the web of fabric 212 on which the design 223 has been printed. Moreover, the cutter 240 creates the first component 222 by cutting the web of fabric 212 around the design 223.

In some embodiments, the web of fabric 212 includes a preexisting design—such as woven into, or printed onto, the web of fabric 212—before the web of fabric 212 is unwound onto the work surface 210. In such embodiments, the cutter 240 may create the first component 222 by cutting the web of fabric 212 around the design 223 even though the printer 230 did not print the design 223.

The portion of the web of fabric 212 that is not part of any component that is created by cutting with the cutter 240 is a web of remainder fabric 216. After cutting the components 222, 224, 226, the web of remainder fabric 216 is removed from the work surface 210 while the components 222, 224, 226 are maintained on the work surface 210. In embodiments in which the work surface 210 is configured to hold the fabric, the components 222, 224, 226 are maintained on the work surface 210 by the holding mechanism of the work surface 210, such as by the electrostatic plate or vacuum assembly described above. In some embodiments, the web of remainder fabric 216 is removed from the work surface 210 by winding the web of remainder fabric 216 onto a roller 215. In some embodiments, the removal of the web of remainder fabric 216 from the work surface 210 is controlled by the controller 150.

Then the components 222, 224, 226 are transported to station 203, which includes an adhesive applicator 250. In some embodiments, the adhesive applicator 250 includes a dispensing nozzle on a carrier 252 that is movable with respect to the fabric on the work surface 210 while dispensing an adhesive 254 onto the fabric. As illustrated, the adhesive applicator 250 applies the adhesive 254 to the second component 224. Additionally, or alternatively, in some embodiments, the adhesive applicator 250 applies the adhesive 254 to the first component 222. Additionally, or alternatively, in some embodiments, the adhesive applicator 250 applies the adhesive 254 to one or more of the additional components 226.

In some embodiments, the adhesive 254 is applied in the form of a liquid deposited onto the component 222, 224, or 226. In some embodiments, the adhesive 254 permeates at least partially into the fabric of the component 222, 224, or 226. In some embodiments, the adhesive 254 at least partially remains on a surface of the fabric of the component 222, 224, or 226. In some embodiments, the adhesive 254 is configured to be cured by any one or more of applying pressure, applying heat, applying moisture, exposing the adhesive to ambient conditions, or waiting for a predetermined duration of time. In some embodiments, the adhesive 254 is deposited onto the component 222, 224, or 226 in one or more of a continuous line, a non-continuous line, one or more droplets, a single line, or multiple lines. In some embodiments, lines or droplets may be deposited onto the component 222, 224, or 226 according to one or more of uniform shape, uniform size, uniform separation between adjacent droplets, varying shape, varying size, or varying separation between adjacent droplets. In some embodiments, the adhesive 254 is deposited onto the component 222, 224, or 226 in a pattern tailored according to any one or more of a desired seam size, a desired seam strength, or a desired accommodation of stretch of the component 222, 224, or 226.

In some embodiments, the adhesive applicator 250 is controlled by the controller 150. In an example, a sensor associated with the adhesive applicator 250 detects a feature of the fabric, such as the printed design 223, a fiducial on or in the fabric, or outline(s) of the component(s). The controller 150 uses information of the detected feature to direct the adhesive applicator 250 to apply the adhesive 254 at a specific location of the fabric.

Then the components 222, 224, 226 are transported to station 204, which includes a robot 260 that is used to position the first component 222 onto the second component 224. Station 204 includes an auxiliary robot 270 that is used to position the first component 222 onto the second component 224. Examples of the robot 260 and the auxiliary robot 270 are described below with respect to FIGS. 8A-8J and FIGS. 9A-9G.

The robot 260 and the auxiliary robot 270 are used in combination to position the first component 222 onto the second component 224. The robot 260 and the auxiliary robot 270 manipulate the first component 222 such that the second side (106, FIG. 1) of the first component 222 faces the second side (106, FIG. 1) of the second component 224. Such an operation may be used for single-faced fabrics or double-faced fabrics, described above. Exemplary details of the operation of the robot 260 and the auxiliary robot 270 are described below with respect to FIGS. 8A-8J and FIGS. 9A-9G. In some embodiments, operation of the robot 260 and the auxiliary robot 270 is controlled by the controller 150.

In some embodiments, the robot 260 may be operated such that the head 264 imparts a load onto the first component 222 in order to press the first component 222 against the second component 224, and promote distribution of the adhesive 254 between and/or within the first 222 and second 224 components.

In some embodiments, the auxiliary robot 270 may be operated such that a head or other component of the auxiliary robot 270 imparts a load onto the first component 222 in order to press the first component 222 against the second component 224, and promote distribution of the adhesive 254 between and/or within the first and second component 222, 224.

In some embodiments, the head 264 of the robot 260 includes a heater. In such embodiments, the heater may be actuated while the head 264 presses the first component 222 onto the second component 224 in order to cure the adhesive 254, and bond the first component 222 to the second component 224. In some embodiments, the heater may be omitted.

In some embodiments, a head or other component of the auxiliary robot 270 includes a heater. In such embodiments, the heater may be actuated while the head or other component presses the first component 222 onto the second component 224 in order to cure the adhesive 254, and bond the first component 222 to the second component 224. In some embodiments, the heater may be omitted.

In some embodiments, the adhesive 254 is cured at a curing station 205. After the first component 222 is positioned onto the second component 224, the components 222, 224 are transported to the curing station 205. In an example, the curing station 205 may include curing apparatus 290, such as a heat press, a roller dryer, or a conveyor dryer, which is used to cure the adhesive 254 and bond the first component 222 to the second component 224. In some embodiments, the curing apparatus 290 cures the adhesive 254 through the application of one or more of heat, pressure, or moisture.

In some embodiments, the curing apparatus 290 at the curing station 205 is controlled by the controller 150. In an example, a sensor associated with the curing apparatus 290 detects a feature of the fabric, such as the printed design 223, a fiducial on or in the fabric, or the outline(s) of the component(s). The controller 150 uses information of the detected feature to direct the curing apparatus 290 to apply the necessary heat and/or pressure to the combined first and second components 222, 224.

In some embodiments, the adhesive 254 may be cured without necessitating the application of pressure and/or heat. In such embodiments, the head 264 of the robot 260 may omit a heater, a head of the auxiliary robot 270 may omit a heater, and/or the curing station 205 may be omitted. Alternatively, at least one heater or the curing station 205 may be present, but unused. In an example, the system 200 may be configured to manufacture fabric articles 220 using an adhesive that requires the application of pressure and/or heat for curing, and may be configured to manufacture fabric articles 220 using an adhesive that does not require the application of pressure and/or heat for curing.

Then the components 222, 224, 226 are transported to station 206, at which the additional components 226 are assembled onto the combined first and second components 222, 224. In some embodiments, the station 206 includes apparatus such as that described in U.S. patent application Ser. No. 17/711,347; filed on Apr. 1, 2022; which is incorporated by reference herein in its entirety. In some embodiments, the methods performed at the station 206 include one or more of the methods disclosed in U.S. patent application Ser. No. 17/711,347. In some embodiments, the assembly of the additional components 226 onto the combined first and second components 222, 224 is controlled by the controller 150. At the station 206, the fabric article 220 formed by the assembled components 222, 224, 226 is turned inside-out such that the second side (106, FIG. 1) of the first component 222, upon which the design 223 is printed, faces outwards from the fabric article 220. In some embodiments, the turning inside-out of the fabric article 220 is controlled by the controller 150.

In some embodiments, the fabric article 220 is transported to a packaging station at which the fabric article 220 is packaged for further transport. In some embodiments, the packaging of the fabric article 220 is controlled by the controller 150.

Figure 3A:
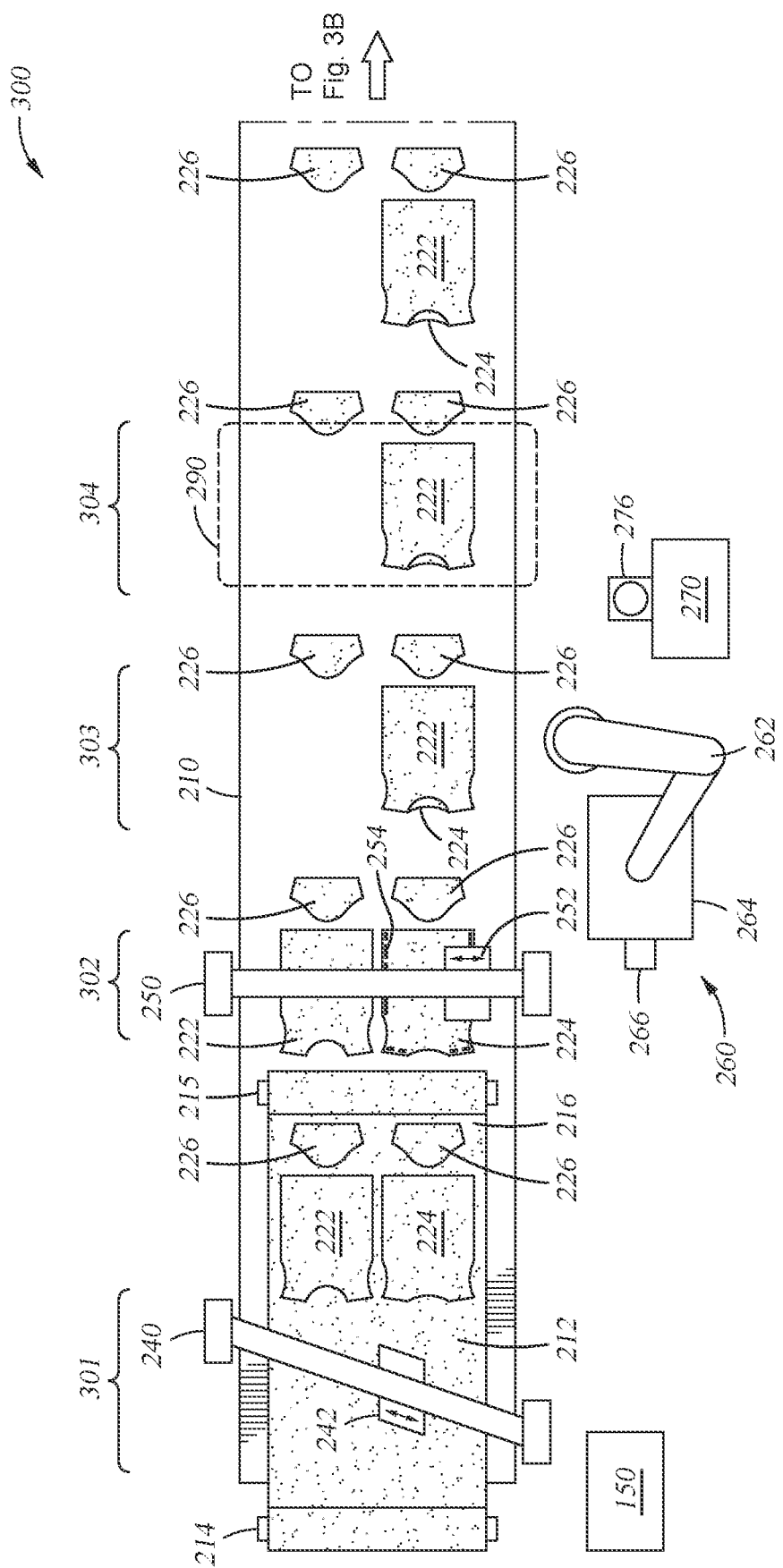
FIGS. 3A and 3B schematically illustrate a system for manufacturing a fabric article.
Figure 3B:
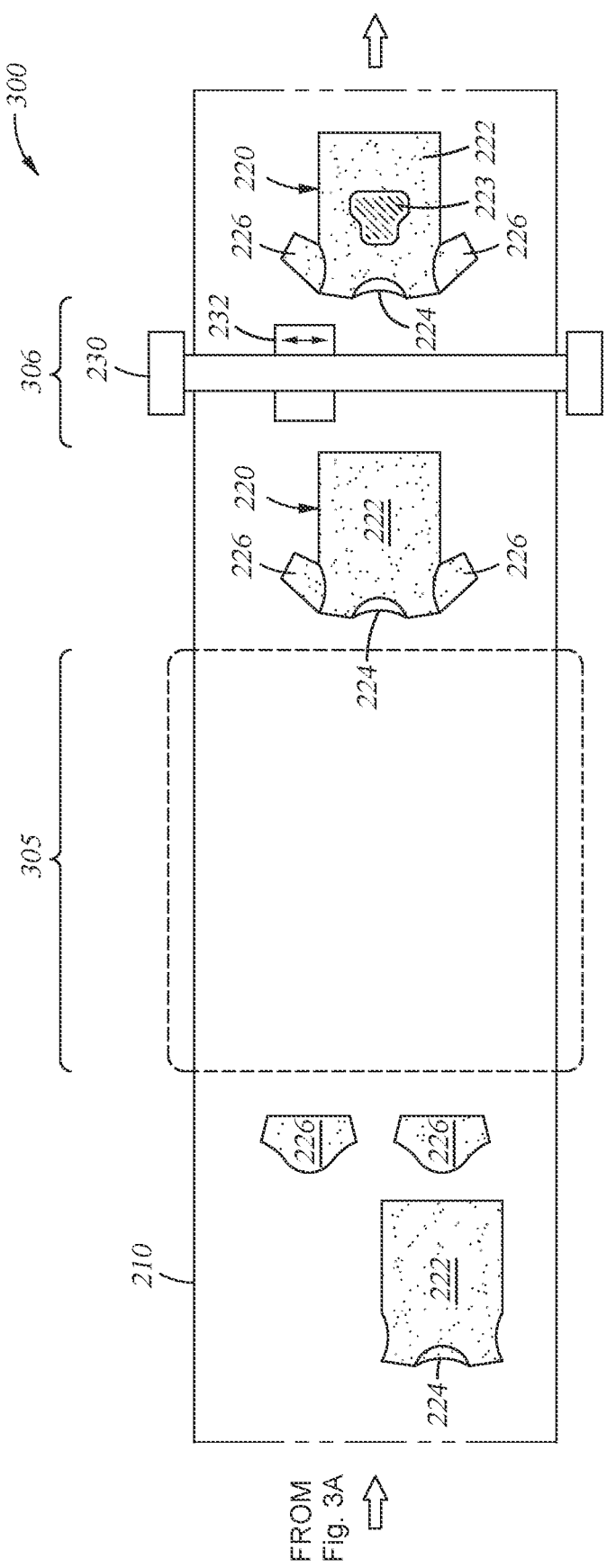

FIGS. 3A and 3B schematically illustrate a system 300 for manufacturing a fabric article 220. System 300 includes the apparatus of system 200, but is configured to perform operations described above in a different sequence. In some embodiments, the system 300 includes the controller 150 for monitoring and controlling the operations of the system 300, such as described above for system 200. In such embodiments, the controller 150 may be configured to monitor and control the operations of any one or more of the elements of the system 300.

A single web of fabric 212 is unwound, such as from the roller 214. The unwound web of fabric 212 is transported to station 301, which includes the cutter 240, described above. The cutter 240 cuts the web of fabric 212 to create a first component 222 of the fabric article 220 and a second component 224 of the fabric article 220. The first component 222 and the second component 224 each include a first side (104, FIG. 1) facing the work surface 210 and a second side (106, FIG. 1) opposite the first side (104, FIG. 1) that faces away from the work surface 210. As illustrated, in some embodiments, the cutter 240 cuts the web of fabric 212 to create one or more additional components 226 of the fabric article 220.

As described above, the portion of the web of fabric 212 that is not part of any component that is created by cutting with the cutter 240 is a web of remainder fabric 216. After cutting the components 222, 224, 226, the web of remainder fabric 216 is removed from the work surface 210 while the components 222, 224, 226 are maintained on the work surface 210, as described above. Then the components 222, 224, 226 are transported to station 302, which includes the adhesive applicator 250, described above. As illustrated, the adhesive applicator 250 applies the adhesive 254 to the second component 224. Additionally, or alternatively, in some embodiments, the adhesive applicator 250 applies the adhesive 254 to the first component 222. Additionally, or alternatively, in some embodiments, the adhesive applicator 250 applies the adhesive 254 to one or more of the additional components 226.

Then components 222, 224, 226 are transported to station 303, which includes the robot 260, described above, that is used to position the first component 222 onto the second component 224. Station 303 includes the auxiliary robot 270 that is used to position the first component 222 onto the second component 224. Examples of the robot 260 and the auxiliary robot 270 are described below with respect to FIGS. 8A-8J and FIGS. 9A-9G.

The robot 260 and the auxiliary robot 270 are used in combination to position the first component 222 onto the second component 224. The robot 260 and the auxiliary robot 270 manipulate the first component 222 such that the second side (106, FIG. 1) of the first component 222 faces the second side (106, FIG. 1) of the second component 224. Such an operation may be used for single-faced fabrics or double-faced fabrics, described above. Exemplary details of the operation of the robot 260 and the auxiliary robot 270 are described below with respect to FIGS. 8A-8J and FIGS. 9A-9G. In some embodiments, operation of the robot 260 and the auxiliary robot 270 is controlled by the controller 150.

In some embodiments, the auxiliary robot 270 is omitted, or is present but unused. In such embodiments, the robot 260 manipulates the first component 222 such that the first side (104, FIG. 1) of the first component 222 faces the second side (106, FIG. 1) of the second component 224. Such an operation may be used for double-faced fabrics, described above. Exemplary details of the operation of the robot 260 in such embodiments are described below with respect to FIGS. 10A-10E.

In some embodiments, the robot 260 may be operated such that the head 264 imparts a load onto the first component 222 in order to press the first component 222 against the second component 224, and promote distribution of the adhesive 254 between and/or within the first and second components 222, 224.

In some embodiments, the auxiliary robot 270 may be operated such that a head or other component of the auxiliary robot 270 imparts a load onto the first component 222 in order to press the first component 222 against the second component 224, and promote distribution of the adhesive 254 between and/or within the first and second component 222, 224.

In some embodiments, the head 264 of the robot 260 includes a heater. In such embodiments, the heater may be actuated while the head 264 presses the first component 222 onto the second component 224 in order to cure the adhesive 254, and bond the first component 222 to the second component 224. In some embodiments, the heater may be omitted.

In some embodiments, a head or other component of the auxiliary robot 270 includes a heater. In such embodiments, the heater may be actuated while the head or other component presses the first component 222 onto the second component 224 in order to cure the adhesive 254, and bond the first component 222 to the second component 224. In some embodiments, the heater may be omitted.

In some embodiments, the adhesive 254 is cured at a curing station 304. After the first component 222 is positioned onto the second component 224, the components 222, 224 are transported to the curing station 304. The curing station 304 includes curing apparatus 290, such as a heat press, a roller dryer, or a conveyor dryer, which—as described above—is used to cure the adhesive 254 and bond the first component 222 to the second component 224. As described above, in some embodiments, the curing apparatus 290 is controlled by the controller 150. As described above with respect to the system 200, in some embodiments, the curing station 304 may be omitted or may be present but unused.

Then the combined first and second components 222, 224 plus any additional components 226 are transported to station 305, at which the additional components 226 are assembled onto the combined first and second components 222, 224. In some embodiments, the station 305 includes apparatus such as that described in U.S. patent application Ser. No. 17/711,347; referenced above. In some embodiments, the methods performed at the station 305 include one or more of the methods disclosed in U.S. patent application Ser. No. 17/711,347. In some embodiments, the assembly of the additional components 226 onto the combined first and second components 222, 224 is controlled by the controller 150.

In some embodiments, at the station 305, the fabric article 220 formed by the assembled components 222, 224, 226 is turned inside-out such that the second side (106, FIG. 1) of the first component 222 faces outwards from the fabric article 220. In some embodiments, the turning inside-out of the fabric article 220 is controlled by the controller 150.

Then the fabric article 220 is transported to station 306, which includes the printer 230. The printer 230 prints a design 223 onto the fabric article 220, such as described above. In some embodiments, such as in the manufacture of fabric articles 220 that do not include a printed design 223, the printing operation may be omitted.

In some embodiments, the fabric article 220 is transported to a packaging station at which the fabric article 220 is packaged for further transport. In some embodiments, the packaging of the fabric article 220 is controlled by the controller 150.

Figure 4A:
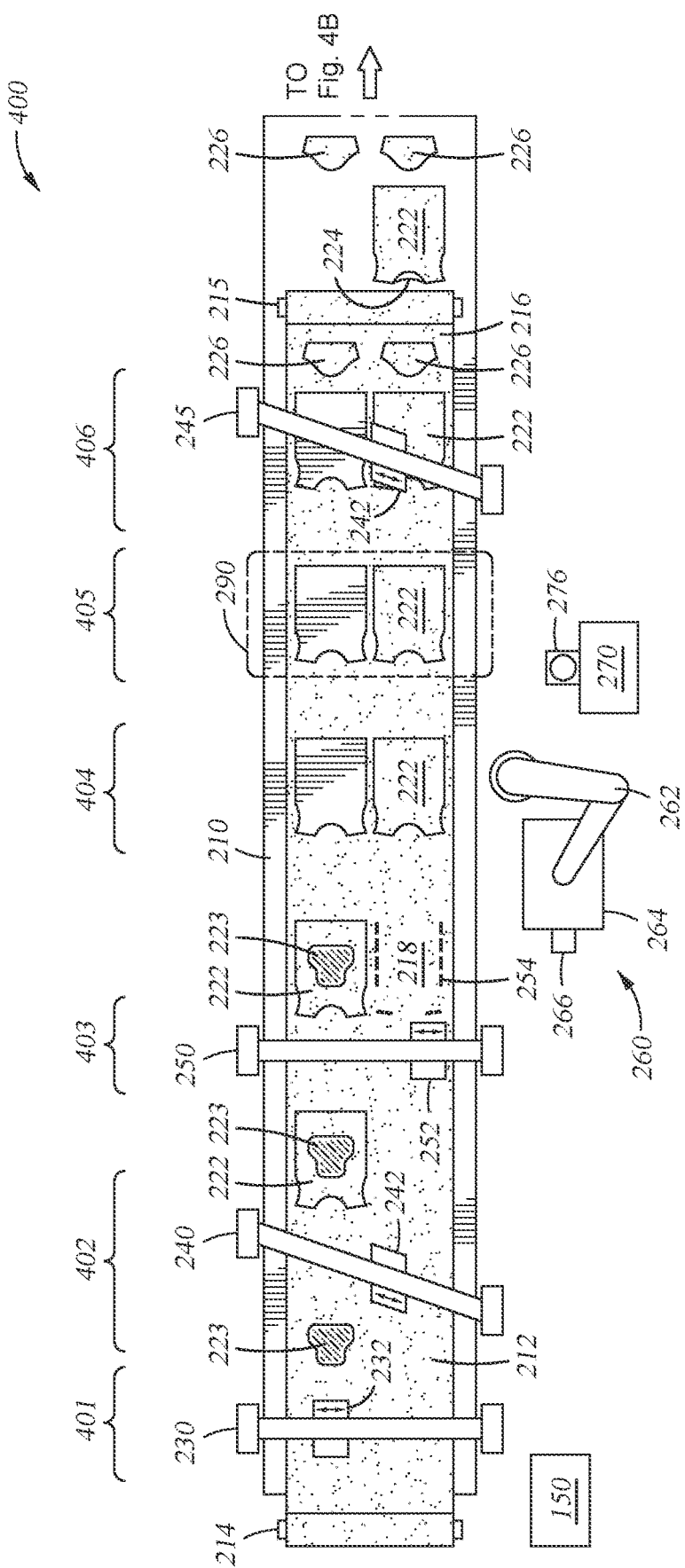
FIGS. 4A and 4B schematically illustrate a system for manufacturing a fabric article.
Figure 4B:
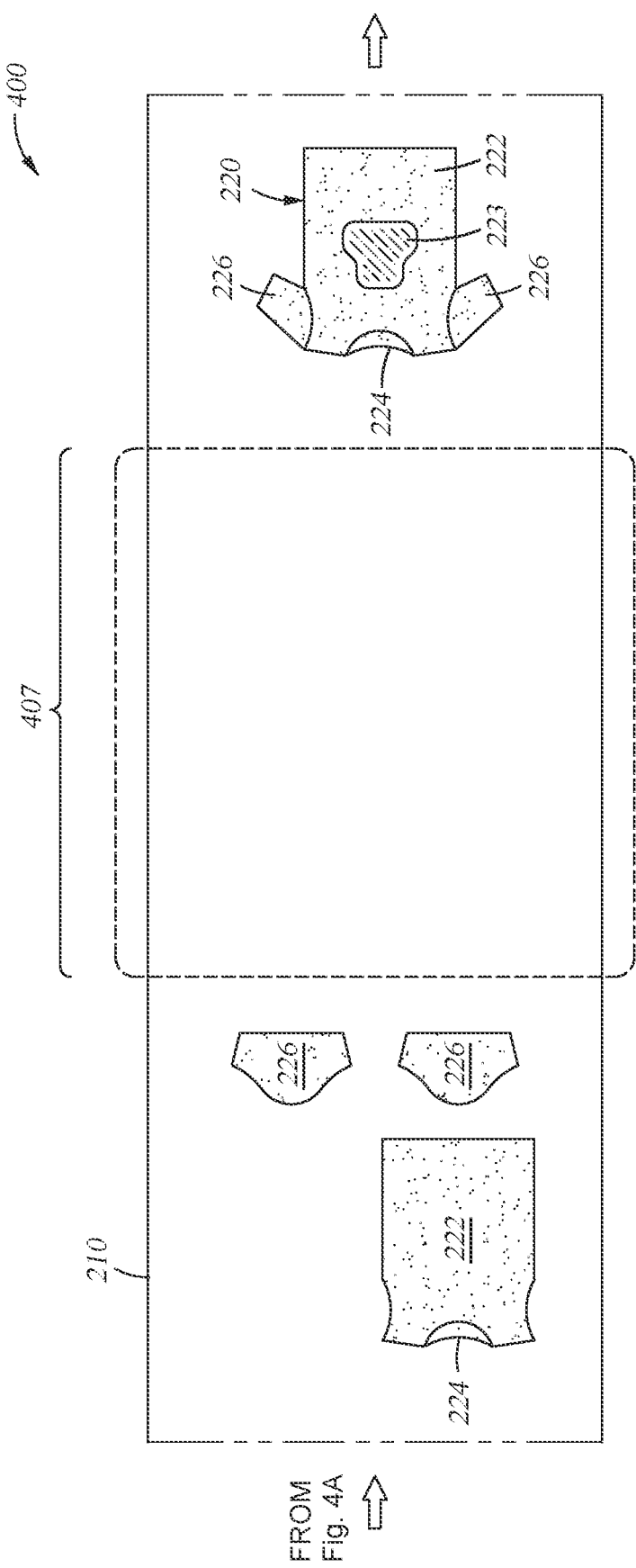

FIGS. 4A and 4B schematically illustrate a system 400 for manufacturing a fabric article 220. System 400 includes the apparatus of system 200, but is configured to perform operations described above in a different sequence. In some embodiments, the system 400 includes the controller 150 for monitoring and controlling the operations of the system 400, such as described above for any of systems 200 or 300. In such embodiments, the controller 150 may be configured to monitor and control the operations of any one or more of the elements of the system 400.

A single web of fabric 212 is unwound, such as from the roller 214. The unwound web of fabric 212 is transported to station 401, which includes the printer 230, described above. The printer 230 prints a design 223 onto the web of fabric 212, as described above. In some embodiments, such as in the manufacture of fabric articles 220 that do not include a printed design 223, the printing operation may be omitted.

Then the web of fabric 212 is transported to station 402, which includes the cutter 240, described above. The cutter 240 cuts the web of fabric 212 to create a first component 222 of the fabric article 220.

Then the web of fabric 212 with the first component 222 is transported to station 403, which includes the adhesive applicator 250, described above. The adhesive applicator 250 applies the adhesive 254, as described above, to a portion 218 of the web of fabric 212 that will become the second component.

Then the web of fabric 212 with the first component 222 is transported to station 404, which includes the robot 260, described above, that is used to position the first component 222 onto the portion 218 of the web of fabric 212. Station 404 includes the auxiliary robot 270 that is used to position the first component 222 onto the portion 218 of the web of fabric 212. Examples of the robot 260 and the auxiliary robot 270 are described below with respect to FIGS. 8A-8J and FIGS. 9A-9G.

The robot 260 and the auxiliary robot 270 are used in combination to position the first component 222 onto the portion 218 of the web of fabric 212. The robot 260 and the auxiliary robot 270 manipulate the first component 222 such that the second side (106, FIG. 1) of the first component 222 faces the second side (116, FIG. 1) of the portion 218 of the web of fabric 212. Such an operation may be used for single-faced fabrics or double-faced fabrics, described above. Exemplary details of the operation of the robot 260 and the auxiliary robot 270 are described below with respect to FIGS. 8A-8J and FIGS. 9A-9G. In some embodiments, operation of the robot 260 and the auxiliary robot 270 is controlled by the controller 150.

In some embodiments, the robot 260 may be operated such that the head 264 imparts a load onto the first component 222 in order to press the first component 222 against the portion 218 of the web of fabric 212, and promote distribution of the adhesive 254 between and/or within the first component 222 and the portion 218 of the web of fabric 212.

In some embodiments, the auxiliary robot 270 may be operated such that a head or other component of the auxiliary robot 270 imparts a load onto the first component 222 in order to press the first component 222 against the portion 218 of the web of fabric 212, and promote distribution of the adhesive 254 between and/or within the first component 222 and the portion 218 of the web of fabric 212.

In some embodiments, the head 264 of the robot 260 includes a heater. In such embodiments, the heater may be actuated while the head 264 presses the first component 222 onto the portion 218 of the web of fabric 212 in order to cure the adhesive 254, and bond the first component 222 to the portion 218 of the web of fabric 212. In some embodiments, the heater may be omitted.

In some embodiments, a head or other component of the auxiliary robot 270 includes a heater. In such embodiments, the heater may be actuated while the head or other component presses the first component 222 onto the portion 218 of the web of fabric 212 in order to cure the adhesive 254, and bond the first component 222 to the portion 218 of the web of fabric 212. In some embodiments, the heater may be omitted.

In some embodiments, the adhesive 254 is cured at a curing station 405. After the first component 222 is positioned onto the portion 218 of the web of fabric 212, the web of fabric 212 with the first component 222 is transported to the curing station 405. The curing station 405 includes curing apparatus 290, such as a heat press, a roller dryer, or a conveyor dryer, which—as described above—is used to cure the adhesive 254 and bond the first component 222 to the portion 218 of the web of fabric 212. As described above, in some embodiments, the curing apparatus 290 is controlled by the controller 150. As described above with respect to the system 200, in some embodiments, the curing station 405 may be omitted or may be present but unused.

Then the web of fabric 212 with the first component 222 is transported to station 406, which includes a second cutter 245. In some embodiments, the second cutter 245 is configured similarly to the cutter 240, described above. The second cutter 245 cuts the web of fabric 212 at the portion 218 of the fabric to create the second component 224. In some embodiments, the second cutter 245 also trims the first component 222 while cutting the web of fabric 212 to create the second component 224. As illustrated, in some embodiments, the second cutter 245 cuts the web of fabric 212 to create one or more additional components 226 of the fabric article 220.

As described above, the portion of the web of fabric 212 that is not part of any component that is created by cutting with the cutter 240 or the second cutter 245 is a web of remainder fabric 216. The web of remainder fabric 216 is removed from the work surface 210 while the components 222, 224, 226 are maintained on the work surface 210, as described above.

Then the combined first and second components 222, 224 plus any additional components 226 are transported to station 407, at which the additional components 226 are assembled onto the combined first and second components 222, 224. In some embodiments, the station 407 includes apparatus such as that described in U.S. patent application Ser. No. 17/711,347; referenced above. In some embodiments, the methods performed at the station 407 include one or more of the methods disclosed in U.S. patent application Ser. No. 17/711,347. In some embodiments, the assembly of the additional components 226 onto the combined first and second components 222, 224 is controlled by the controller 150. At the station 407, the fabric article 220 formed by the assembled components 222, 224, 226 is turned inside-out such that the second side (106, FIG. 1) of the first component 222, upon which the design 223 is printed, faces outwards from the fabric article 220. In some embodiments, the turning inside-out of the fabric article 220 is controlled by the controller 150.

In some embodiments, the fabric article 220 is transported to a packaging station at which the fabric article 220 is packaged for further transport. In some embodiments, the packaging of the fabric article 220 is controlled by the controller 150.

Figure 5A:
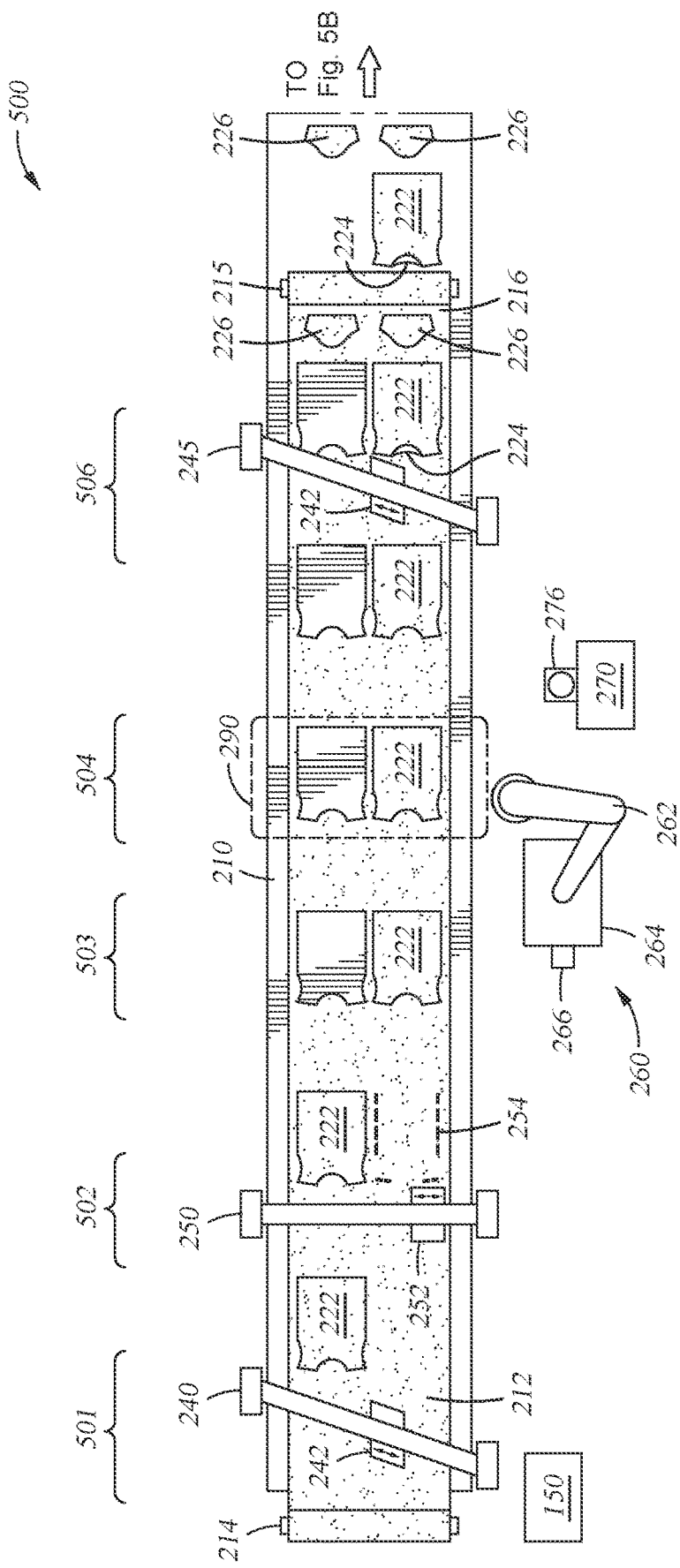
FIGS. 5A and 5B schematically illustrate a system for manufacturing a fabric article.
Figure 5B:
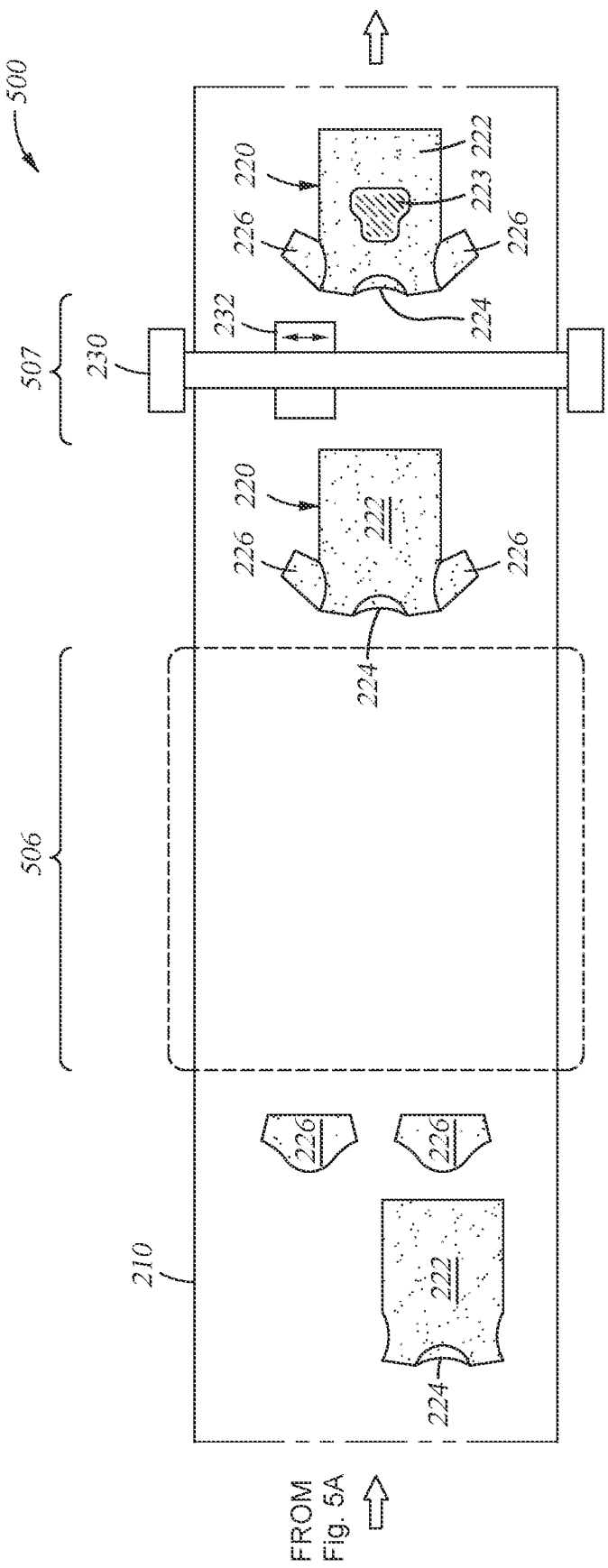

FIGS. 5A and 5B schematically illustrate a system 500 for manufacturing a fabric article 220. System 500 includes the apparatus of system 200, but is configured to perform operations described above in a different sequence. In some embodiments, the system 500 includes the controller 150 for monitoring and controlling the operations of the system 500, such as described above for any of systems 200, 300, or 400. In such embodiments, the controller 150 may be configured to monitor and control the operations of any one or more of the elements of the system 500.

A single web of fabric 212 is unwound, such as from the roller 214. The unwound web of fabric 212 is transported to station 501, which includes the cutter 240, described above. The cutter 240 cuts the web of fabric 212 to create a first component 222 of the fabric article 220. The web of fabric 212 includes a first side (114, FIG. 1) facing the work surface 210 and a second side (116, FIG. 1) opposite the first side (114, FIG. 1) that faces away from the work surface 210. The first component 222 includes a first side (104, FIG. 1) facing the work surface 210 and a second side (106, FIG. 1) opposite the first side (104, FIG. 1) that faces away from the work surface 210.

Then the web of fabric 212 with the first component 222 is transported to station 502, which includes the adhesive applicator 250, described above. The adhesive applicator 250 applies the adhesive 254, as described above, to a portion 218 of the web of fabric 212 that will become the second component.

Then the web of fabric 212 with the first component 222 is transported to station 503, which includes the robot 260, described above, that is used to position the first component 222 onto the portion 218 of the web of fabric 212. Station 503 includes the auxiliary robot 270 that is used to position the first component 222 onto the portion 218 of the web of fabric 212. Examples of the robot 260 and the auxiliary robot 270 are described below with respect to FIGS. 8A-8J and FIGS. 9A-9G.

The robot 260 and the auxiliary robot 270 are used in combination to position the first component 222 onto the portion 218 of the web of fabric 212. The robot 260 and the auxiliary robot 270 manipulate the first component 222 such that the second side (106, FIG. 1) of the first component 222 faces the second side (116, FIG. 1) of the portion 218 of the web of fabric 212. Such an operation may be used for single-faced fabrics or double-faced fabrics, described above. Exemplary details of the operation of the robot 260 and the auxiliary robot 270 are described below with respect to FIGS. 8A-8J and FIGS. 9A-9G. In some embodiments, operation of the robot 260 and the auxiliary robot 270 is controlled by the controller 150.

In some embodiments, the auxiliary robot 270 is omitted, or is present but unused. In such embodiments, the robot 260 manipulates the first component 222 such that the first side (104, FIG. 1) of the first component 222 faces the second side (116, FIG. 1) of the portion 218 of the web of fabric 212. Such an operation may be used for double-faced fabrics, described above. Exemplary details of the operation of the robot 260 in such embodiments are described below with respect to FIGS. 10A-10E.

In some embodiments, the robot 260 may be operated such that the head 264 imparts a load onto the first component 222 in order to press the first component 222 against the portion 218 of the web of fabric 212, and promote distribution of the adhesive 254 between and/or within the first component 222 and the portion 218 of the web of fabric 212.

In some embodiments, the auxiliary robot 270 may be operated such that a head or other component of the auxiliary robot 270 imparts a load onto the first component 222 in order to press the first component 222 against the portion 218 of the web of fabric 212, and promote distribution of the adhesive 254 between and/or within the first component 222 and the portion 218 of the web of fabric 212.

In some embodiments, the head 264 of the robot 260 includes a heater. In such embodiments, the heater may be actuated while the head 264 presses the first component 222 onto the portion 218 of the web of fabric 212 in order to cure the adhesive 254, and bond the first component 222 to the portion 218 of the web of fabric 212. In some embodiments, the heater may be omitted.

In some embodiments, a head or other component of the auxiliary robot 270 includes a heater. In such embodiments, the heater may be actuated while the head or other component presses the first component 222 onto the portion 218 of the web of fabric 212 in order to cure the adhesive 254, and bond the first component 222 to the portion 218 of the web of fabric 212. In some embodiments, the heater may be omitted.

In some embodiments, the adhesive 254 is cured at a curing station 504. After the first component 222 is positioned onto the portion 218 of the web of fabric 212, the web of fabric 212 with the first component 222 is transported to the curing station 504. The curing station 504 includes curing apparatus 290, such as a heat press, a roller dryer, or a conveyor dryer, which—as described above—is used to cure the adhesive 254 and bond the first component 222 to the portion 218 of the web of fabric 212. As described above, in some embodiments, the curing apparatus 290 is controlled by the controller 150. As described above with respect to the system 200, in some embodiments, the curing station 504 may be omitted or may be present but unused.

Then the web of fabric 212 with the first component 222 is transported to station 505, which includes the second cutter 245, described above. The second cutter 245 cuts the web of fabric 212 at the portion 218 of the web of fabric 212 to create the second component 224. In some embodiments, the second cutter 245 also trims the first component 222 while cutting the web of fabric 212 to create the second component 224. As illustrated, in some embodiments, the second cutter 245 cuts the web of fabric 212 to create one or more additional components 226 of the fabric article 220.

As described above, the portion of the web of fabric 212 that is not part of any component that is created by cutting with the cutter 240 or the second cutter 245 is a web of remainder fabric 216. The web of remainder fabric 216 is removed from the work surface 210 while the components 222, 224, 226 are maintained on the work surface 210, as described above.

Then the combined first and second components 222, 224 plus any additional components 226 are transported to station 506, at which the additional components 226 are assembled onto the combined first and second components 222, 224. In some embodiments, the station 506 includes apparatus such as that described in U.S. patent application Ser. No. 17/711,347; referenced above. In some embodiments, the methods performed at the station 506 include one or more of the methods disclosed in U.S. patent application Ser. No. 17/711,347. In some embodiments, the assembly of the additional components 226 onto the combined first and second components 222, 224 is controlled by the controller 150.

In some embodiments, at the station 506, the fabric article 220 formed by the assembled components 222, 224, 226 is turned inside-out such that the second side (106, FIG. 1) of the first component 222 faces outwards from the fabric article 220. In some embodiments, the turning inside-out of the fabric article 220 is controlled by the controller 150.

Then the fabric article 220 is transported to station 507, which includes the printer 230. The printer 230 prints a design 223 onto the fabric article 220, as described above. In some embodiments, such as in the manufacture of fabric articles 220 that do not include a printed design 223, the printing operation may be omitted.

In some embodiments, the fabric article 220 is transported to a packaging station at which the fabric article 220 is packaged for further transport. In some embodiments, the packaging of the fabric article 220 is controlled by the controller 150.

Figure 6A:
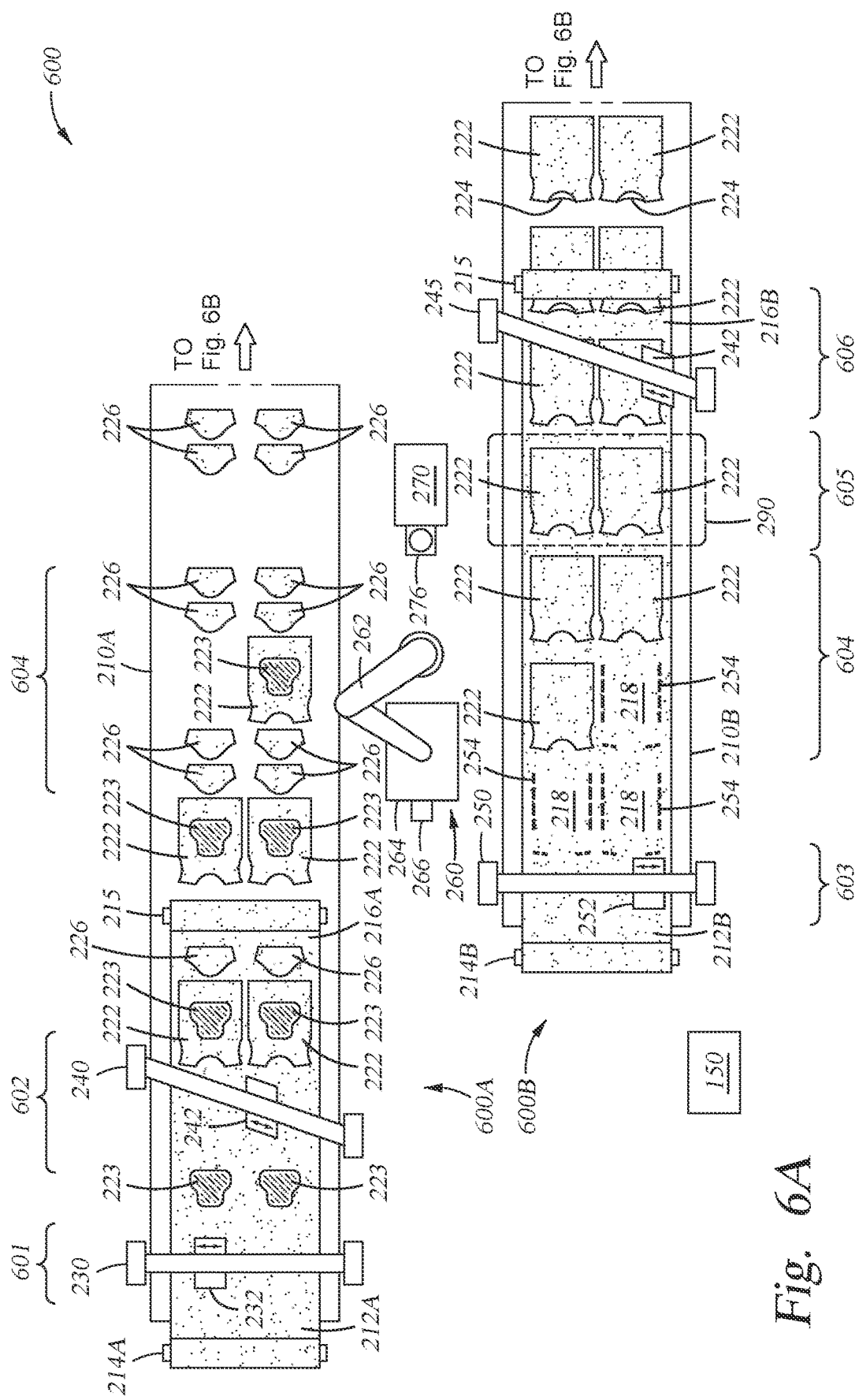

FIGS. 6A and 6B schematically illustrate a system 600 for manufacturing a fabric article 220. System 600 includes the apparatus of system 200, but is configured to perform operations in a different sequence. In some embodiments, the system 600 includes the controller 150 for monitoring and controlling the operations of the system 600, such as described above for any of systems 200, 300, 400, or 500. In such embodiments, the controller 150 may be configured to monitor and control the operations of any one or more of the elements of the system 600.

System 600 includes two subsystems 600A and 600B. The two subsystems 600A and 600B are operated in parallel. In subsystem 600A, the work surface 210 is represented by a first work surface 210A. In subsystem 600B, the work surface 210 is represented by a second work surface 210B.

In subsystem 600A, a single web of a first fabric 212A is unwound, such as from roller 214A. The unwound web of first fabric 212A is transported to station 601, which includes the printer 230, described above. The printer 230 prints a design 223 onto the web of first fabric 212A, as described above. In some embodiments, such as in the manufacture of fabric articles 220 that do not include a printed design 223, the printing operation may be omitted.

Then the unwound web of first fabric 212A is transported to station 602, which includes a cutter 240, described above. The cutter 240 cuts the web of first fabric 212A to create a first component 222 of the fabric article 220. As illustrated, in some embodiments, the cutter 240 cuts the web of first fabric 212A to create one or more additional components 226 of the fabric article 220.

As described above, the portion of the web of first fabric 212A that is not part of any component that is created by cutting with the cutter 240 is a web of remainder first fabric 216A. After cutting the components 222, 226, the web of remainder first fabric 216A is removed from the first work surface 210A while the components 222, 226 are maintained on the first work surface 210A, as described above.

Then the components are transported to station 604, which includes the robot 260, described above, that is used to transfer the first component 222 to the subsystem 600B, as described below. Station 604 includes the auxiliary robot 270 that is used to transfer the first component 222 to the subsystem 600B. Examples of the robot 260 and the auxiliary robot 270 are described below with respect to FIGS. 8A-8J and FIGS. 9A-9G.

In subsystem 600B, a single web of a second fabric 212B is unwound, such as from roller 214B. The unwound web of second fabric 212B is transported to station 603, which includes the adhesive applicator 250, described above. The adhesive applicator 250 applies the adhesive 254, as described above, to a portion 218 of the web of second fabric 212B that will become the second component.

Then the web of second fabric 212B is transported to station 604. The robot 260 and the auxiliary robot 270 at station 604 are used in combination to transfer the first component 222 from subsystem 600A to the subsystem 600B. The robot 260 and the auxiliary robot 270 at station 604 are used in combination to position the first component 222 onto the portion 218 of the web of second fabric 212B. The robot 260 and the auxiliary robot 270 manipulate the first component 222 such that the second side (106, FIG. 1) of the first component 222 faces the second side (116, FIG. 1) of the portion 218 of the web of second fabric 212B. Such an operation may be used for single-faced fabrics or double-faced fabrics, described above. Exemplary details of the operation of the robot 260 and the auxiliary robot 270 are described below with respect to FIGS. 8A-8J and FIGS. 9A-9G. In some embodiments, operation of the robot 260 and the auxiliary robot 270 is controlled by the controller 150.

In some embodiments, the robot 260 may be operated such that the head 264 imparts a load onto the first component 222 in order to press the first component 222 against the portion 218 of the web of second fabric 212B, and promote distribution of the adhesive 254 between and/or within the first component 222 and the portion 218 of the web of second fabric 212B.

In some embodiments, the auxiliary robot 270 may be operated such that a head or other component of the auxiliary robot 270 imparts a load onto the first component 222 in order to press the first component 222 against the portion 218 of the web of second fabric 212B, and promote distribution of the adhesive 254 between and/or within the first component 222 and the portion 218 of the web of second fabric 212B.

In some embodiments, the head 264 of the robot 260 includes a heater. In such embodiments, the heater may be actuated while the head 264 presses the first component 222 onto the portion 218 of the web of second fabric 212B in order to cure the adhesive 254, and bond the first component 222 to the portion 218 of the web of second fabric 212B. In some embodiments, the heater may be omitted.

In some embodiments, a head or other component of the auxiliary robot 270 includes a heater. In such embodiments, the heater may be actuated while the head or other component presses the first component 222 onto the portion 218 of the web of second fabric 212B in order to cure the adhesive 254, and bond the first component 222 to the portion 218 of the web of second fabric 212B. In some embodiments, the heater may be omitted.

In some embodiments, the adhesive 254 is cured at a curing station 605. After the first component 222 is positioned onto the portion 218 of the web of second fabric 212B, the web of second fabric 212B with the first component 222 is transported to the curing station 605. The curing station 605 includes curing apparatus 290, such as a heat press, a roller dryer, or a conveyor dryer, which—as described above—is used to cure the adhesive 254 and bond the first component 222 to the portion 218 of the web of second fabric 212B. As described above, in some embodiments, the curing apparatus 290 is controlled by the controller 150. As described above with respect to the system 200, in some embodiments, the curing station 605 may be omitted or may be present but unused.

Then the web of second fabric 212B with the first component 222 is transported to station 606, which includes the second cutter 245, described above. The second cutter 245 cuts the web of second fabric 212B at the portion 218 of the web of second fabric 212B to create the second component 224. In some embodiments, the second cutter 245 also trims the first component 222 while cutting the web of second fabric 212B to create the second component 224. In some embodiments, the second cutter 245 cuts the web of second fabric 212B to create one or more additional components of the fabric article 220.

As described above, the portion of the web of second fabric 212B that is not part of any component that is created by cutting with the second cutter 245 is a web of remainder second fabric 216B. The web of remainder second fabric 216B is removed from the second work surface 210B while the components are maintained on the second work surface 210B, as described above.

In embodiments in which the cutter 240 cuts the web of first fabric 212A to create one or more additional components 226 of the fabric article 220, the one or more additional components 226 are transported to station 607, at which the one or more additional components 226 are assembled onto the combined first and second components 222, 224. In some of such embodiments, the transfer of the additional components 226 from the subsystem 600A at station 607 may be facilitated by robot 295.

Additionally, the combined first and second components 222, 224 are transported to station 607. In embodiments in which the second cutter 245 cuts the web of second fabric 212B to create one or more additional components, the combined first and second components 222, 224 plus the additional components are transported to station 607.

In some embodiments, the station 607 includes apparatus such as that described in U.S. patent application Ser. No. 17/711,347; referenced above. In some embodiments, the methods performed at the station 607 include one or more of the methods disclosed in U.S. patent application Ser. No. 17/711,347. In some embodiments, the assembly of the additional components 226 onto the combined first and second components 222, 224 is controlled by the controller 150. At the station 607, the fabric article 220 formed by the assembled components 222, 224, 226 is turned inside-out such that the second side (106, FIG. 1) of the first component 222, upon which the design 223 is printed, faces outwards from the fabric article 220. In some embodiments, the turning inside-out of the fabric article 220 is controlled by the controller 150.

In some embodiments, the fabric article 220 is transported to a packaging station at which the fabric article 220 is packaged for further transport. In some embodiments, the packaging of the fabric article 220 is controlled by the controller 150.

FIGS. 7A and 7B schematically illustrate a system 700 for manufacturing a fabric article 220. System 700 includes the apparatus of system 200, but is configured to perform operations in a different sequence. In some embodiments, the system 700 includes the controller 150 for monitoring and controlling the operations of the system 700, such as described above for any of systems 200, 300, 400, 500, or 600. In such embodiments, the controller 150 may be configured to monitor and control the operations of any one or more of the elements of the system 700.

System 700 includes two subsystems 700A and 700B. The two subsystems 700A and 700B are operated in parallel. In subsystem 700A, the work surface 210 is represented by a first work surface 210A. In subsystem 700B, the work surface 210 is represented by a second work surface 210B.

In subsystem 700A, a single web of a first fabric 212A is unwound, such as from roller 214A. The unwound web of first fabric 212A is transported to station 701, which includes the cutter 240, described above. The cutter 240 cuts the web of first fabric 212A to create a first component 222 of the fabric article 220. The first component 222 includes a first side (104, FIG. 1) facing the first work surface 210A and a second side (106, FIG. 1) opposite the first side (104, FIG. 1) that faces away from the first work surface 210A. As illustrated, in some embodiments, the cutter 240 cuts the web of first fabric 212A to create one or more additional components 226 of the fabric article 220.

As described above, the portion of the web of first fabric 212A that is not part of any component that is created by cutting with the cutter 240 is a web of remainder first fabric 216A. After cutting the components 222, 226, the web of remainder first fabric 216A is removed from the first work surface 210A while the components 222, 226 are maintained on the first work surface 210A, as described above.

Then the components are transported to station 703, which includes the robot 260, described above, that is used to transfer the first component 222 to the subsystem 700B, as described below. Station 703 includes the auxiliary robot 270 that is used to transfer the first component 222 to the subsystem 700B. Examples of the robot 260 and the auxiliary robot 270 are described below with respect to FIGS. 8A-8J and FIGS. 9A-9G.

In subsystem 700B, a single web of a second fabric 212B is unwound, such as from roller 214B. The unwound web of second fabric 212B is transported to station 702, which includes the adhesive applicator 250, described above. The adhesive applicator 250 applies the adhesive 254, as described above, to a portion 218 of the web of second fabric 212B that will become the second component.

Then the web of second fabric 212B is transported to station 703. The robot 260 and the auxiliary robot 270 at station 703 are used in combination to transfer the first component 222 from the first work surface 210A of subsystem 700A to the subsystem 700B. The robot 260 and the auxiliary robot 270 are used in combination in order to position the first component 222 onto the portion 218 of the web of second fabric 212B. The robot 260 and the auxiliary robot 270 at station 703 are used in combination to position the first component 222 onto the portion 218 of the web of second fabric 212B. The robot 260 and the auxiliary robot 270 manipulate the first component 222 such that the second side (106, FIG. 1) of the first component 222 faces the second side (116, FIG. 1) of the portion 218 of the web of second fabric 212B. Such an operation may be used for single-faced fabrics or double-faced fabrics, described above. Exemplary details of the operation of the robot 260 and the auxiliary robot 270 are described below with respect to FIGS. 8A-8J and FIGS. 9A-9G. In some embodiments, operation of the robot 260 and the auxiliary robot 270 is controlled by the controller 150.

In some embodiments, the auxiliary robot 270 is omitted, or is present but unused. In such embodiments, the robot 260 manipulates the first component 222 such that the first side (104, FIG. 1) of the first component 222 faces the second side (106, FIG. 1) of the portion 218 of the web of second fabric 212B. Such an operation may be used for double-faced fabrics, described above. Exemplary details of the operation of the robot 260 in such embodiments are described below with respect to FIGS. 10A-10E.

In some embodiments, the robot 260 may be operated such that the head 264 imparts a load onto the first component 222 in order to press the first component 222 against the portion 218 of the web of second fabric 212B, and promote distribution of the adhesive 254 between and/or within the first component 222 and the portion 218 of the web of second fabric 212B.

In some embodiments, the auxiliary robot 270 may be operated such that a head or other component of the auxiliary robot 270 imparts a load onto the first component 222 in order to press the first component 222 against the portion 218 of the web of second fabric 212B, and promote distribution of the adhesive 254 between and/or within the first component 222 and the portion 218 of the web of second fabric 212B.

In some embodiments, the head 264 of the robot 260 includes a heater. In such embodiments, the heater may be actuated while the head 264 presses the first component 222 onto the portion 218 of the web of second fabric 212B in order to cure the adhesive 254, and bond the first component 222 to the portion 218 of the web of second fabric 212B. In some embodiments, the heater may be omitted.

In some embodiments, a head or other component of the auxiliary robot 270 includes a heater. In such embodiments, the heater may be actuated while the head or other component presses the first component 222 onto the portion 218 of the web of second fabric 212B in order to cure the adhesive 254, and bond the first component 222 to the portion 218 of the web of second fabric 212B. In some embodiments, the heater may be omitted.

In some embodiments, the adhesive 254 is cured at a curing station 704. After the first component 222 is positioned onto the portion 218 of the web of second fabric 212B, the web of second fabric 212B with the first component 222 is transported to the curing station 704. The curing station 704 includes curing apparatus 290, such as a heat press, a roller dryer, or a conveyor dryer, which—as described above—is used to cure the adhesive 254 and bond the first component 222 to the portion 218 of the web of second fabric 212B. As described above, in some embodiments, the curing apparatus 290 is controlled by the controller 150. As described above with respect to the system 200, in some embodiments, the curing station 704 may be omitted or may be present but unused.

Then the web of second fabric 212B with the first component 222 is transported to station 705, which includes the second cutter 245, described above. The second cutter 245 cuts the web of second fabric 212B at the portion 218 of the web of second fabric 212B to create the second component 224. In some embodiments, the second cutter 245 also trims the first component 222 while cutting the web of second fabric 212B to create the second component 224. In some embodiments, the second cutter 245 cuts the web of second fabric 212B to create one or more additional components of the fabric article 220.

As described above, the portion of the web of second fabric 212B that is not part of any component that is created by cutting with the second cutter 245 is a web of remainder second fabric 216B. The web of remainder second fabric 216B is removed from the second work surface 210B while the components are maintained on the second work surface 210B, as described above.

In embodiments in which the cutter 240 cuts the web of first fabric 212A to create one or more additional components 226 of the fabric article 220, the one or more additional components 226 are transported to station 706, at which the one or more additional components 226 are assembled onto the combined first and second components 222, 224. In some of such embodiments, the transfer of the additional components 226 from the subsystem 700A at station 706 may be facilitated by robot 295.

Additionally, the combined first and second components 222, 224 are transported to station 706. In embodiments in which the second cutter 245 cuts the web of second fabric 212B to create one or more additional components, the combined first and second components 222, 224 plus the additional components are transported to station 706.

In some embodiments, the station 706 includes apparatus such as that described in U.S. patent application Ser. No. 17/711,347; referenced above. In some embodiments, the methods performed at the station 706 include one or more of the methods disclosed in U.S. patent application Ser. No. 17/711,347. In some embodiments, the assembly of the additional components 226 onto the combined first and second components 222, 224 is controlled by the controller 150.

In some embodiments, at the station 706, the fabric article 220 formed by the assembled components 222, 224, 226 is turned inside-out such that the second side (106, FIG. 1) of the first component 222 faces outwards from the fabric article 220. In some embodiments, the turning inside-out of the fabric article 220 is controlled by the controller 150.

Then the fabric article 220 is transported to station 707, which includes the printer 230. The printer 230 prints a design 223 onto the fabric article 220, as described above. In some embodiments, such as in the manufacture of fabric articles 220 that do not include a printed design 223, the printing operation may be omitted.

In some embodiments, the fabric article 220 is transported to a packaging station at which the fabric article 220 is packaged for further transport. In some embodiments, the packaging of the fabric article 220 is controlled by the controller 150.

FIGS. 8A-8J, 9A-9G, and 10A-10E schematically illustrate exemplary operations of the robot 260 and the auxiliary robot 270. In some embodiments, operations of the robot 260 and the auxiliary robot 270 of FIGS. 8A-8J, 9A-9G, and 10A-10E are monitored and controlled by the controller 150.

In FIGS. 8A-8J, 9A-9G, and 10A-10E, work surface 810 represents any work surface 210, 210A, 210B of any system 200, 300, 400, 500, 600, 700 of the present disclosure. Item 820 represents any first component 222 or other component, such as additional component 226, of a fabric article 220 of the present disclosure. Item 830 represents any second component 224 or other component, such as additional component 226, of a fabric article 220 and/or any part (such as the portion 218) of a web of fabric 212, 212A, 212B of the present disclosure.

In some embodiments, the robot 260 may be mounted on a gantry above the work surface 810. In some embodiments, the robot 260 may be freestanding. In some embodiments, the robot 260 includes an articulated arm 262 attached to a head 264 that selectively holds and releases the item 820. In some embodiments, the head 264 includes clamps or other grippers that selectively hold or release the item 820. In some embodiments, the head 264 includes an electrostatic plate to selectively hold or release the item 820. In some embodiments, the head 264 includes a vacuum assembly, such as a perforated plate coupled to a vacuum pump, to selectively hold or release the item 820.

In some embodiments, the robot 260 includes a sensor 266 that is used to assist with positioning of the head 264 with respect to the item 820 and the item 830. In an example, the sensor 266 includes a camera. For instance, the camera may capture an image of the item 820, and relay the image to the controller 150. The controller 150 may determine the position, orientation, and/or extent of the item 820 on the work surface 810. The controller 150 may direct the head 264 to the item 820 according to the determined position, orientation, and/or extent of the item 820 on the work surface 810.

Figure 8A:
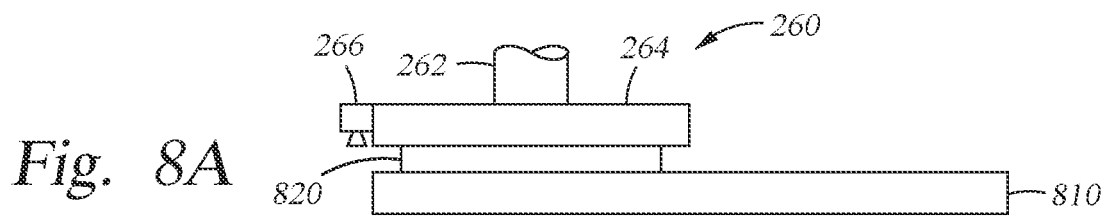
FIGS. 8A-8J schematically illustrate an exemplary operational sequence of a robot and an auxiliary robot.
Figure 8B:
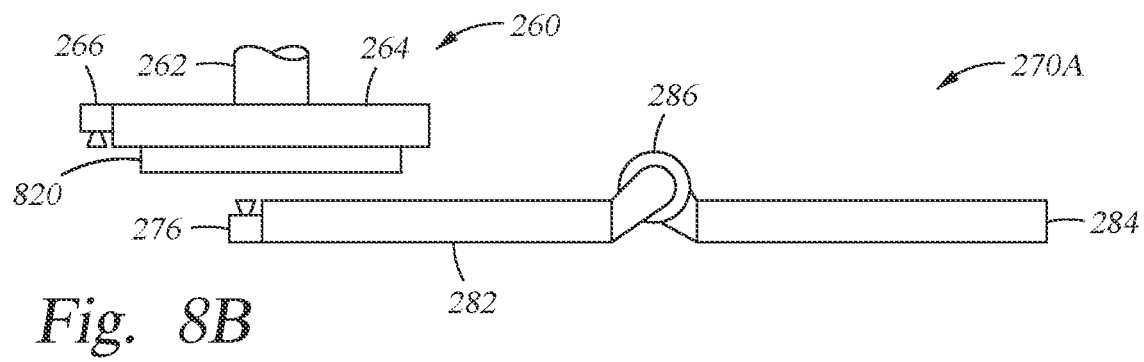
Figure 8C:
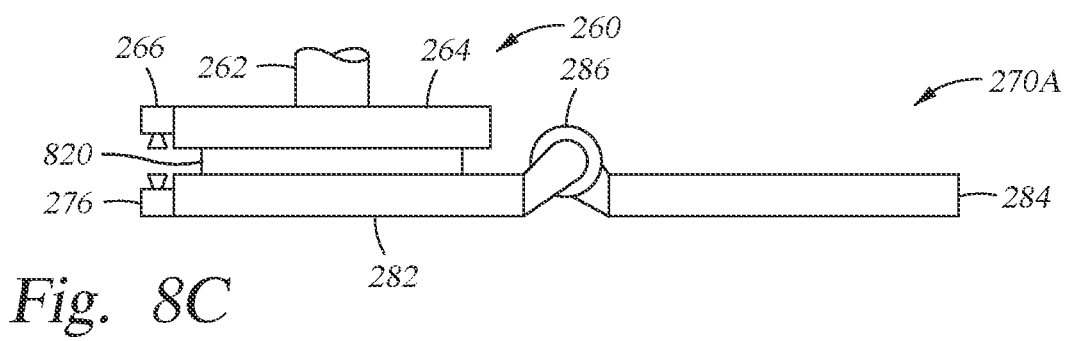

FIG. 8A shows the head 264 of the robot 260 being attached to the item 820. In some embodiments, the sensor 266 may be used to determine the position, orientation, and/or extent of the item 820 on the work surface 810 before the head 264 is attached to the item 820. FIG. 8B shows the robot 260 carrying the item 820 to the auxiliary robot 270. In the depicted embodiment, the auxiliary robot 270 is represented by auxiliary robot 270A. In this example, the auxiliary robot 270A is represented as first and second platens 282, 284 that are joined by a hinge 286. As illustrated, in some embodiments, the auxiliary robot 270A includes the second sensor 276, as described above. In an example, the second sensor 276 includes a camera. As shown in the Figure, in some embodiments, the second sensor 276 may be used to determine the position, orientation, and/or extent of the item 820 on the head 264 of the robot 260. Such information may be used to direct the head 264 of the robot 260 when the head 264 positions the item 820 onto the first platen 282. FIG. 8C shows the head 264 of the robot 260 positioning the item 820 onto the first platen 282. Then the head 264 of the robot 260 disengages from the item 820.

Figure 8D:
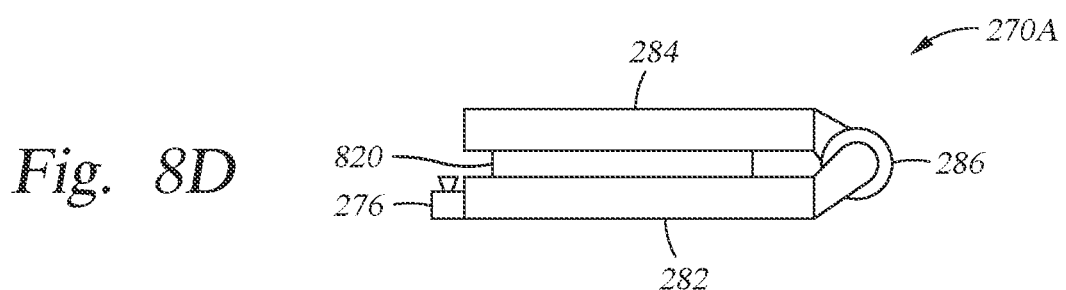

FIG. 8D shows the second platen 284 engaging with the item 820. As illustrated, in some embodiments, the second platen 284 pivots about the hinge 286 to engage the item 820. In some embodiments, the first platen 282 pivots about the hinge 286 to bring the item 820 into engagement with the second platen 284. In some embodiments, the first platen 282 and/or the second platen 284 may include an electrostatic plate to selectively hold or release the item 820. In some embodiments, the first platen 282 and/or the second platen 284 may include a vacuum assembly, such as a perforated plate coupled to a vacuum pump, to selectively hold or release the item 820.

Figure 8E:
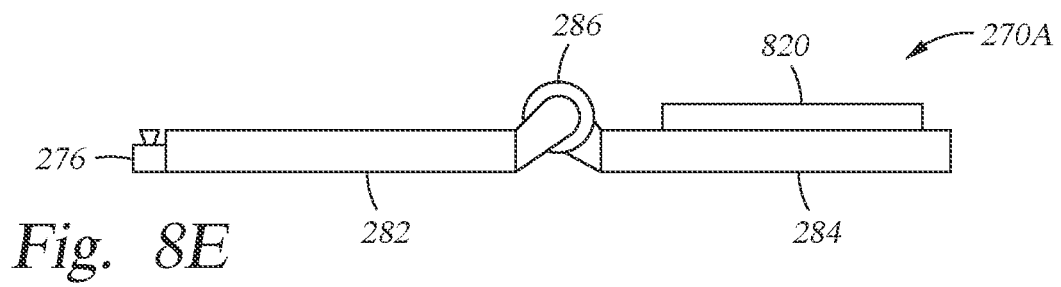
Figure 8F:
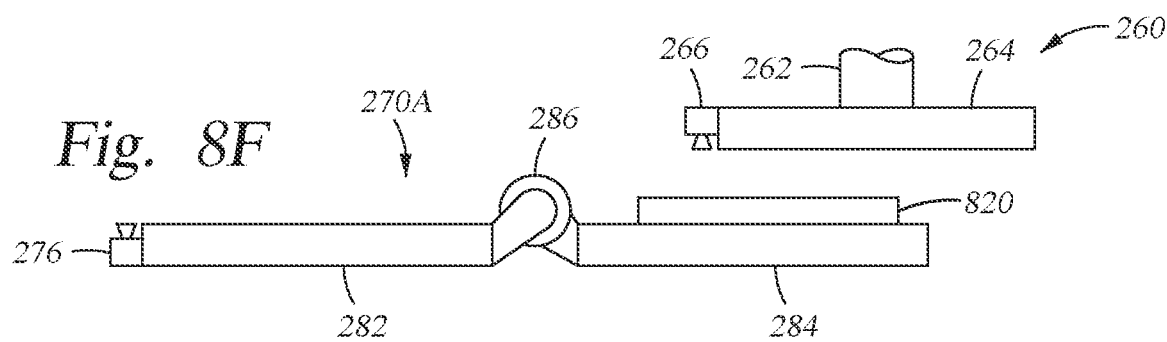
Figure 8G:
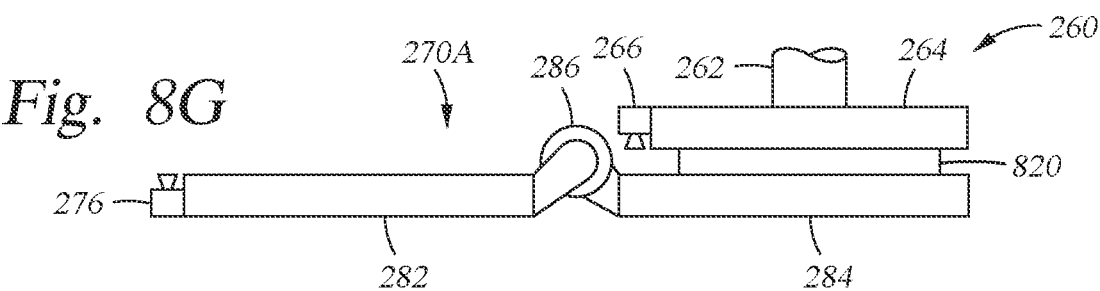

FIG. 8E shows the first platen 282 disengaged from the item 820. The item 820 is engaged with the second platen 284. FIG. 8F shows the head 264 of the robot 260 approaching the auxiliary robot 270A in order to pick up the item 820. As illustrated, in some embodiments, the sensor 266 may be used to determine the position, orientation, and/or extent of the item 820 on the second platen 284 before the head 264 is attached to the item 820. FIG. 8G shows the head 264 of the robot 260 being attached to the item 820. Then the robot 260 lifts the item 820 off the second platen 284.

Figure 8H:
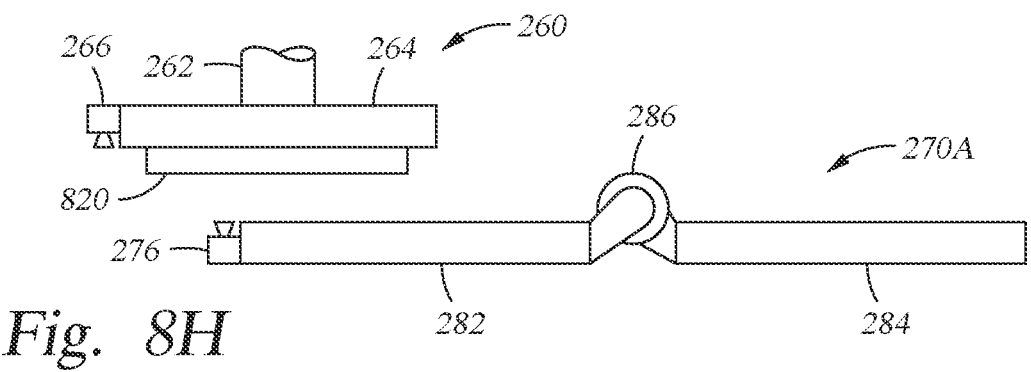
Figure 8I:
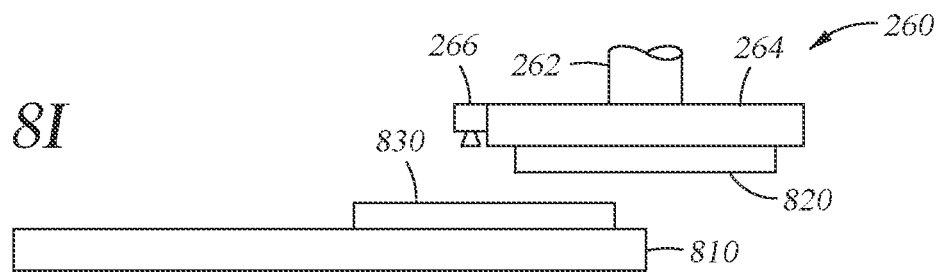
Figure 8J:
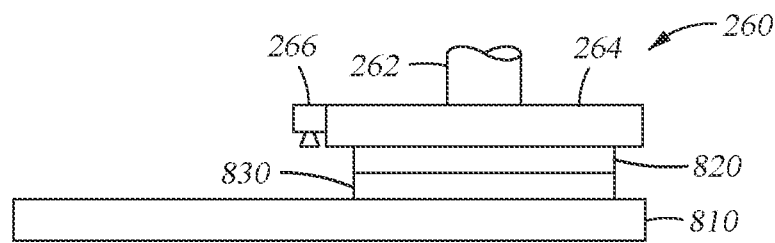

FIG. 8H shows the second sensor 276 being used to determine the position, orientation, and/or extent of the item 820 on the head 264 of the robot 260. Such information may be used to direct the head 264 of the robot 260 when the head 264 positions the item 820 onto the item 830 on the work surface 810. FIG. 8I shows the sensor 266 of the robot 260 being used to determine the position, orientation, and/or extent of the item 830 on the work surface 810 before the robot 260 positions the item 820 onto the item 830. FIG. 8J shows the robot 260 positioning the item 820 onto the item 830 on the work surface 810. Then the head 264 of the robot 260 disengages from the item 820.

Figure 9A:
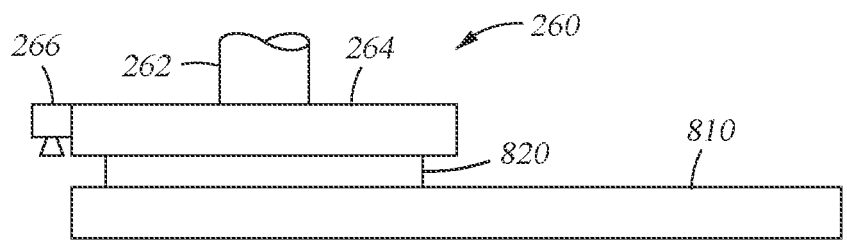
FIGS. 9A-9G schematically illustrate an exemplary operational sequence of a robot and an auxiliary robot.
Figure 9B:
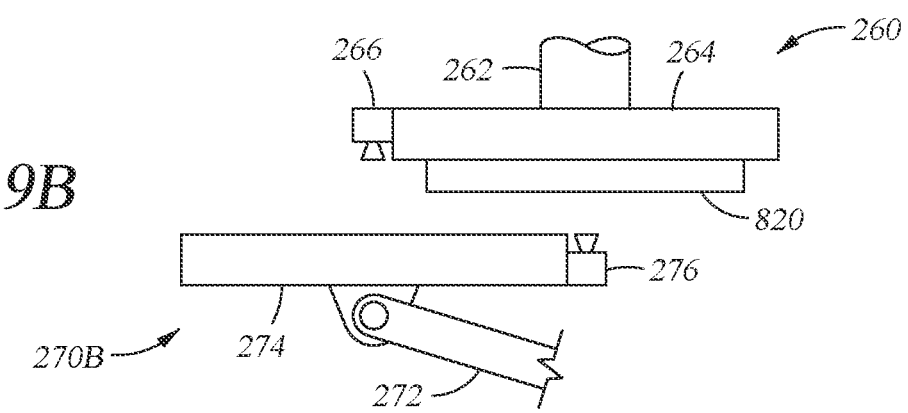
Figure 9C:
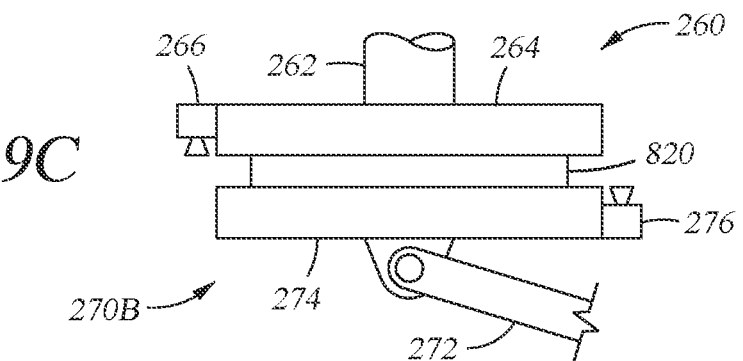

FIGS. 9A-9G schematically illustrate an exemplary operational sequence of the robot 260 and the auxiliary robot 270. FIG. 9A shows the head 264 of the robot 260 being attached to the item 820. In some embodiments, the sensor 266 may be used to determine the position, orientation, and/or extent of the item 820 on the work surface 810 before the head 264 is attached to the item 820. FIG. 9B shows the robot 260 carrying the item 820 to the auxiliary robot 270. In the depicted embodiment, the auxiliary robot 270 is represented by auxiliary robot 270B. In this example, the auxiliary robot 270B is represented as including an articulated arm 272 attached to a head 274. In some embodiments, the head 274 is configured similarly to the head 264 of the robot 260. As illustrated, in some embodiments, the auxiliary robot 270B includes the second sensor 276, as described above. In an example, the second sensor 276 includes a camera. As shown in the Figure, in some embodiments, the second sensor 276 may be used to determine the position, orientation, and/or extent of the item 820 on the head 264 of the robot 260. Such information may be used to direct the head 264 of the robot 260 when the head 264 positions the item 820 onto the head 274 of the auxiliary robot 270B. FIG. 9C shows the head 264 of the robot 260 positioning the item 820 onto the head 274 of the auxiliary robot 270. Then the head 264 of the robot 260 disengages from the item 820.

Figure 9D:
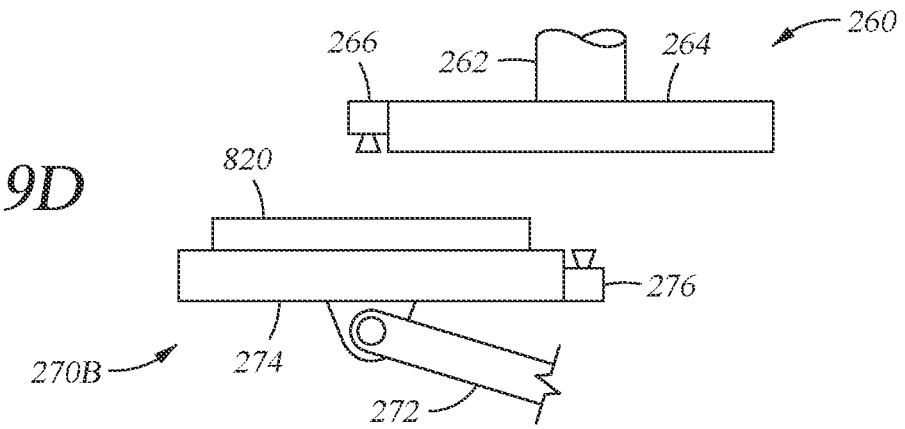
Figure 9E:
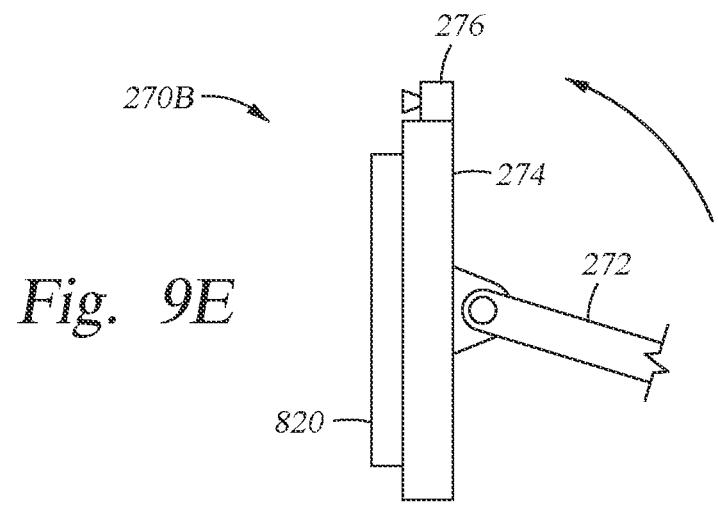
Figure 9F:
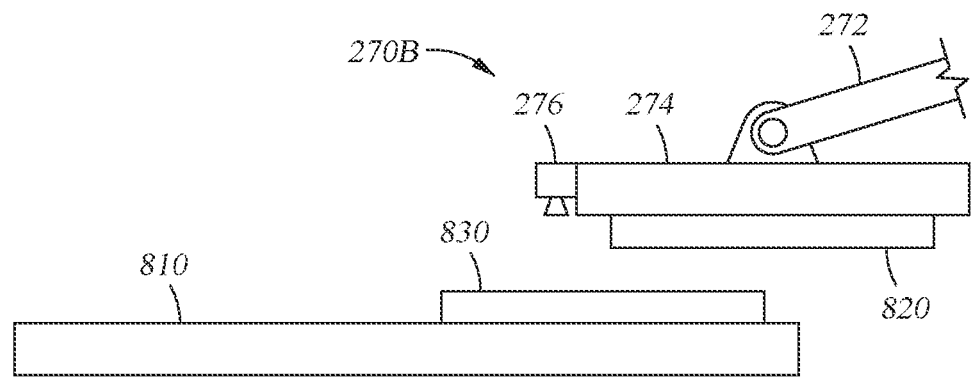
Figure 9G:
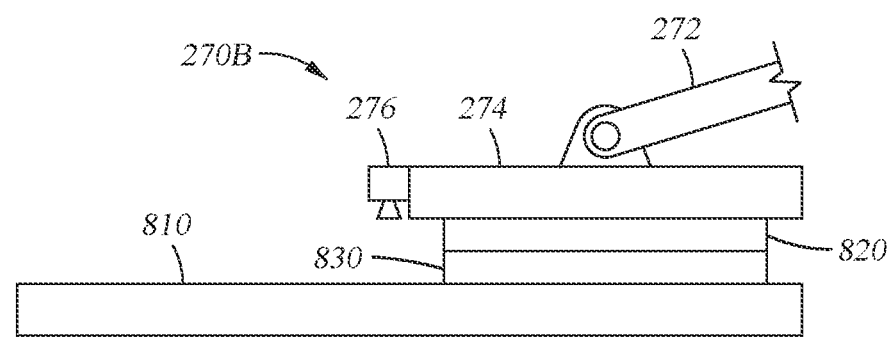

FIG. 9D shows the sensor 266 of the robot 260 being used to determine the position, orientation, and/or extent of the item 820 on the head 274 of the auxiliary robot 270B. Such information may be used to direct the head 274 of the auxiliary robot 270B when the head 274 positions the item 820 onto the item 830 on the work surface 810. FIG. 9E shows the head 274 of the auxiliary robot 270B swiveling to orient the item 820 for placement onto the item 830 on the work surface 810. FIG. 9F shows the second sensor 276 of the auxiliary robot 270B being used to determine the position, orientation, and/or extent of the item 830 on the work surface 810 before the auxiliary robot 270B positions the item 820 onto the item 830. FIG. 9G shows the auxiliary robot 270B positioning the item 820 onto the item 830 on the work surface 810. Then the head 274 of the auxiliary robot 270B disengages from the item 820.

In some embodiments, such as when any of systems 300, 500, or 700 are used to manufacture fabric articles using double-faced fabrics, the auxiliary robot 270 may be omitted, or unused. In such embodiments, the robot 260 positions the item 820 onto the item 830 such that the first side (104, FIG. 1) of the item 820 faces the second side (106, FIG. 1) of the item 830. FIGS. 10A-10E provide an exemplary schematic illustration of such operations.

As described above, work surface 810 represents any work surface 210, 210A, 210B of any system 200, 300, 400, 500, 600, 700 of the present disclosure. Item 820 represents any first component 222 or other component, such as additional component 226, of a fabric article 220 of the present disclosure. Item 830 represents any second component 224 or other component, such as additional component 226, of a fabric article 220 and/or any part (such as the portion 218) of a web of fabric 212, 212A, 212B of the present disclosure.

Figure 10A:
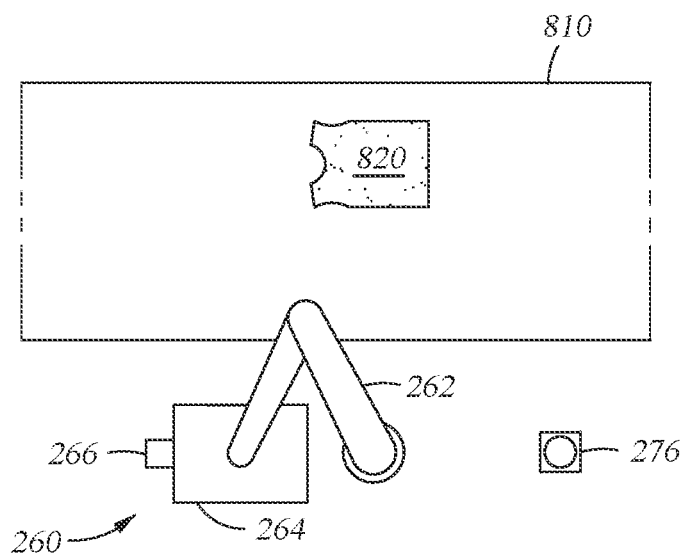
FIGS. 10A-10E schematically illustrate an exemplary operational sequence of a robot.
Figure 10B:
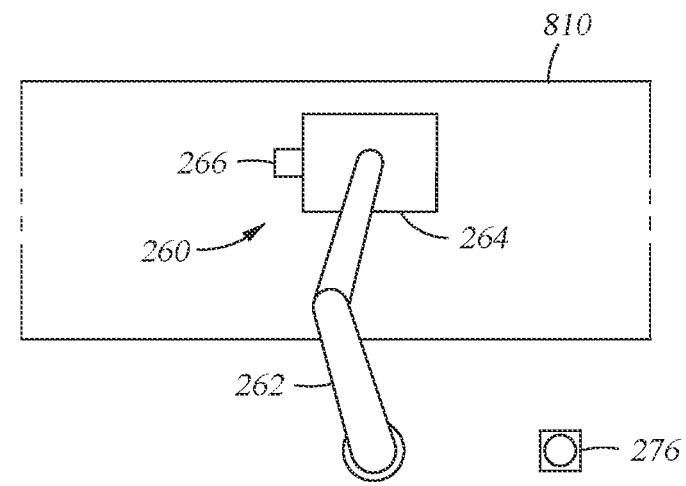
Figure 10C:
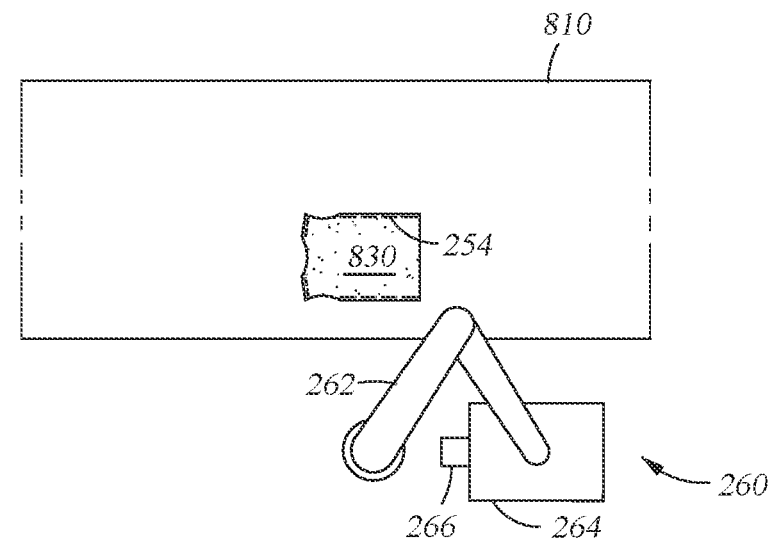

FIG. 10A shows item 820 on work surface 810. In FIG. 10B, shows the head 264 of the robot 260 being attached to the item 820. In some embodiments, the sensor 266 may be used to determine the position, orientation, and/or extent of the item 820 on the work surface 810 before the head 264 is attached to the item 820. As shown in FIG. 10C, in some embodiments, the second sensor 276 may be used to determine the position, orientation, and/or extent of the item 820 on the head 264 of the robot 260. Such information may be used to direct the head 264 of the robot 260 when the head 264 positions the item 820 onto the item 830 on the work surface 810. FIG. 10C also shows the item 830 with adhesive 254 on the work surface 810.

Figure 10D:
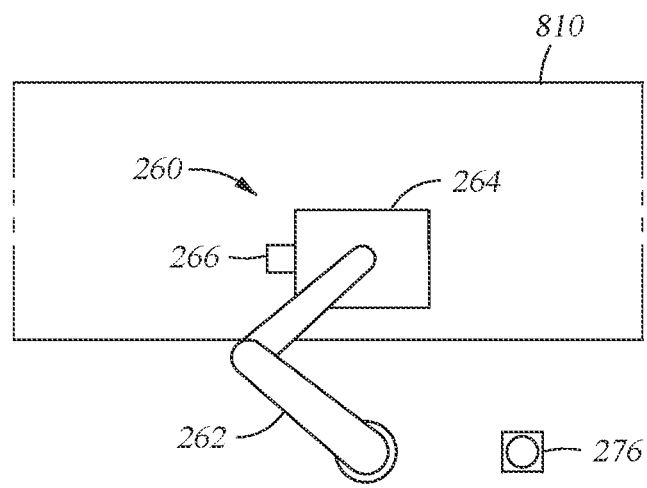
Figure 10E:
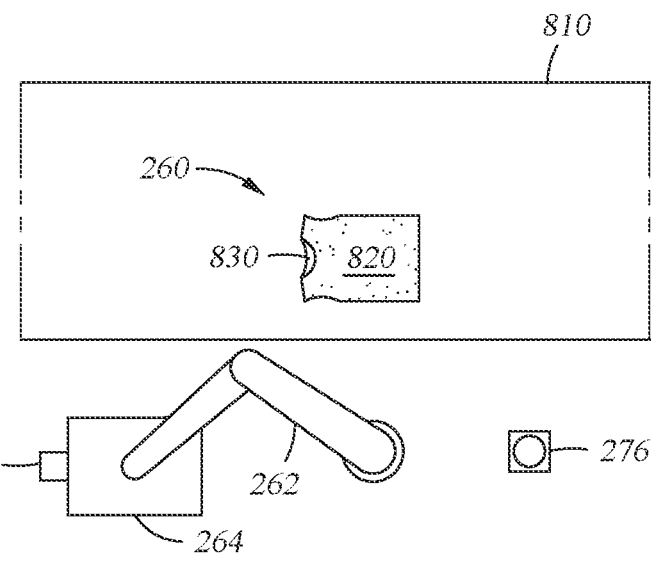

FIG. 10D shows the robot 260 positioning the item 820 onto the item 830 on the work surface 810. In some embodiments, the sensor 266 of the robot 260 is used to determine the position, orientation, and/or extent of the item 830 on the work surface 810 before the robot 260 positions the item 820 onto the item 830. After positioning the item 820 onto the item 830, the head 264 of the robot 260 disengages from the item 820. FIG. 10E shows the robot 260 disengaged from the item 820, and shows the item 820 in position upon the item 830 on the work surface 810.

The systems and methods of the present disclosure facilitate automation of fabric article manufacture. Such automation benefits manufacturing plant throughput and consistent quality control of finished products.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

It is contemplated that elements and features of any one disclosed embodiment may be beneficially incorporated in one or more other embodiments. While the foregoing is directed to embodiments of the present disclosure, other and further embodiments of the disclosure may be devised without departing from the basic scope thereof, and the scope thereof is determined by the claims that follow.

What is claimed is:

1. A method of manufacturing a fabric article, comprising:
   moving an unwound fabric continuously along a conveyor including a fabric holding mechanism configured to selectively hold the unwound fabric;
   printing a design onto the unwound fabric;
   detecting a feature that indicates one or more cutting patterns and a first set of characteristics for a first application of adhesive material and a second set of characteristics for a second application of adhesive material, wherein the first set of characteristics is different than the second set of characteristics;
   cutting, based on the feature, the unwound fabric around the one or more cutting patterns and the design to create a first component and a web of remainder fabric, wherein the first component includes a first side facing a work surface of the conveyor and a second side opposite the first side of the first component;
   cutting, based on the feature, the unwound fabric around the one or more cutting patterns to create a second component and the web of remainder fabric, wherein the second component includes a first side facing the work surface of the conveyor and a second side opposite the first side of the second component;
   removing the web of remainder fabric from the first component and the second component, wherein the fabric holding mechanism is configured to selectively hold the first component and the second component and release the web of remainder fabric;
   applying, based on the feature, a first adhesive material having the first set of characteristics to a first portion of the second side of the first component;

applying, based on the feature, a second adhesive material having the second set of characteristics to a first portion of the second side of the second component;

positioning the first component onto the second component such that the second side of the first component faces the second side of the second component; and bonding the first component to the second component using the adhesive material.

2. The method of claim 1, wherein bonding the first component to the second component further comprises curing the adhesive material.

3. The method of claim 2, wherein the curing is performed by a heat press, a roller dryer, or a conveyor dryer.

4. The method of claim 1, further comprising:

cutting the unwound fabric to create a third component of the fabric article; and joining the third component to at least one of the first component or the second component after bonding the first component to the second component.

5. The method of claim 1, wherein a first robot transfers the first component to a second robot.

6. The method of claim 5, wherein a second robot positions the first component onto the second component.

7. The method of claim 1, wherein a first robot positions the first component onto the second component.

8. The method of claim 1, wherein the fabric holding mechanism comprises an electrostatic plate.

9. The method of claim 1, wherein the fabric holding mechanism comprises a vacuum assembly.

10. The method of claim 1, wherein the web of remainder fabric is removed by winding the web of remainder fabric onto a roller.

* * * * *